(12) United States Patent
Ikeda

(10) Patent No.: US 6,348,969 B1
(45) Date of Patent: *Feb. 19, 2002

(54) PRINTING WITH DESIGNATION OF PROCESSING

(75) Inventor: Jun Ikeda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,564

(22) Filed: Jan. 22, 1998

(30) Foreign Application Priority Data

Jan. 31, 1997 (JP) .............................................. 9-019382

(51) Int. Cl.$^7$ .............................................. G06K 15/00
(52) U.S. Cl. ..................................... 358/1.15; 358/1.17
(58) Field of Search ............................... 358/1.13, 1.14, 358/1.15, 1.17, 1.16, 1.18, 1.2, 1.6, 1.9, 1.11, 1.1, 468, 407, 404, 444; 382/239, 244; 345/619, 501, 520, 522

(56) References Cited

U.S. PATENT DOCUMENTS

| | | | | |
|---|---|---|---|---|
| 4,814,792 A | * | 3/1989 | Yamanobe et al. | 347/248 |
| 5,129,049 A | * | 7/1992 | Cuzzo et al. | 358/1.14 |
| 5,337,258 A | * | 8/1994 | Dennis | 714/47 |
| 5,602,976 A | * | 2/1997 | Cooper et al. | 358/1.17 |
| 5,796,930 A | * | 8/1998 | Gauthier et al. | 358/1.17 |
| 5,832,126 A | * | 11/1998 | Tanaka | 382/239 |
| 5,913,018 A | * | 6/1999 | Sela | 358/1.17 |

* cited by examiner

Primary Examiner—Dov Popovici
(74) Attorney, Agent, or Firm—Fitzpatrick, Cella, Harper & Scinto

(57) ABSTRACT

When a host computer transmits print data to a printer, the computer investigates the possibility of overrun per each band of band obtained by partitioning a page into bands. The host computer designates pre-rendering processing in regard to bands in which overrun is judged to be possible. Upon receiving the print data, the printer generates and compresses image data beforehand in regard to a band for which pre-rendering has been designated and stores the compressed image data. In case of a band for which pre-rendering has not been designated, the printer generates an intermediate code at a stage prior to the generation of image data from the print data. At the time of printing, image data is generated in one of two band buffers and image data is output from one band buffer. At this time the compressed image data is decompressed in case of a band for which pre-rendering has been designated, and image data is generated from an intermediate code in case of a band for which an intermediate code has been generated.

21 Claims, 16 Drawing Sheets

PRINTING WITH DESIGNATION OF PROCESSING

BACKGROUND OF THE INVENTION

1. Field of the Invention

This invention relates to an image output control method and printing apparatus for receiving print data from a source for supply of data such as a host computer and printing out the data on a medium such as paper.

2. Description of the Related Art

A system for processing and printing documents such as a document creating and printing system generally is constructed as shown in FIG. 2. The system is constituted by a host computer 101 serving as a processor for subjecting an output document to processing such as typesetting, and a printer 102 connected to the host computer 101 for fixing output document data, which is the result of processing by the host computer, on a medium such as paper by performing printing on the medium. More specifically, the user employs the host computer 101 to edit an image that is to be output. When editing ends, the host computer 101 converts the edited document data to an output image, i.e. print data, that will be accepted by the printer 102, and sends this data to the printer 102. In accordance with the data input thereto, the printer 102 performs the actual printing on the paper.

The printer 102 includes a printer controller 1021 and a printer engine 1022. The processing executed by the printer controller 1021 will be described in detail with reference to the block diagram of FIG. 3 and flowchart of FIG. 4, which exemplify examples of the prior art.

FIG. 3 is a block diagram showing the internal components of the printer controller 1021. Specifically, an interface 201 receives print data from a source for supply of data such as the host computer and performs an exchange of status with the host computer. A control unit 202 controls the overall printer apparatus and executes data processing. A memory controller 203 controls a DRAM 204, which is a main memory provided within the printer controller. A DMAC 205 is provided so that the printer controller may send image data to a printer engine 207 at the time of printing. An engine interface 206 sends the printer engine 207 image data output via the DMAC 205. The printer engine 207 fixes the image data, which has been output by the engine interface 206, on a medium such as paper, thereby realizing printing.

FIG. 4 is a flowchart showing an example of the operation of the printer controller illustrated in the block diagram of FIG. 3.

Print data is received from a source for supply of data such as the a computer (step S301). The print data may be characteristic code data usable by the printer or a print instruction, referred to as page description language (PDL), to the printer. The received data is stored in the DRAM (step S302). In order to compensate for a difference in speed between the communication speed of the interface and the speed of data processing, the received data generally is buffered temporarily in a memory area, referred to as a reception buffer, of the DRAM 204. The processing of step S302 corresponds to this operation.

Next, the stored data is analyzed and preparation for printing the image is performed (step S303). In this example, band processing is executed. According to banding processing, the memory capacity of a full bitmap area is not used. Rather, use is made of two band memory areas (referred to as band buffers) of a size obtained by partitioning the paper size into prescribed widths in the main-scan direction. Image data is developed in these band buffers. With band processing, image data that has been stored in one band memory area is printed, during which time image data is generated in the other band memory area. Band processing is achieved through use of this double-buffer format employing two band buffers. To accomplish this, conversion of data to intermediate codes capable of undergoing banding processing is carried out at step S303. In regard to one page of data, an area obtained by partitioning the data according to the size of the band member is referred to as a band or print band.

Next, the image of the initial print band is developed in one of the band areas (S304). In actuality, since the format used here is the double-buffer format, only the images of the initial two bands, for which printing has not yet begun, are generated in the two band memory areas. Processing for generating image data based upon object data such as character codes and visualizing the generated image data shall be referred to as "rendering" below.

When rendering is completed, the DMAC 205 and engine interface 206 are set in a print-enabled state and the printer engine 207 is started (step S305). Printing is performed using the bit image already generated at step S304 (S306).

When image data is sent to the printer engine 207 via the DMAC 205 and engine interface 206 and the band memory is left empty, the control unit 202 renders the image data corresponding to the next print band in this band memory via the memory controller 203 (step S307).

When the printing of image data in one band memory is completed, page end is judged at step S308. If the printing of one page is not finished, the input to the DMAC 205 and engine interface 206 is changed over to the band memory from which printing is be performed next, thereby to prepare for the printing of the next band (S309). More specifically, resetting of the DMA transfer address and changing of the band memory address rasterized by the control unit 202 are performed taking advantage of an interrupt which gives notification of the end of transfer of the band image data from the DMAC 205.

If band changeover has been performed, the DMAC 205 and engine interface 206 transfer the image data of the next band to the printer engine 207 and the next band is printed by the engine. In addition, the control unit 202 rasterizes the image of the next band in the band memory whose image data has already been sent. One page of printing is achieved by repeating this operation.

It has been presumed here that two band memories serve as the areas for developing band images. Before the printer engine 207 is started up, rendering in these two band memories is completed at step S304. As a consequence, in the initial band printing, parallel operation in which the image data is rasterized while it is being transmitted does not occur. Further, since data to be printed vanishes also in regard to the operating sequence prior to the end of one page, parallel operation does not occur.

Further, arbitration for access to each DRAM due to a data request from the DMAC 205 at the time of parallel operation and data write by rasterization from the controller 202 is carried out by the memory controller 203.

In a device which performs one page of printing by executing such band processing without possessing one page of bitmap memory, rasterization processing during parallel operation cannot keep up with the sending of print data when the image to be rendered is complicated or when the printing speed of the printer is high. This phenomenon is known as overrun. The same problem arises also in an apparatus which handles grayscale image data by allocated a plurality of bits to each pixel to realize grayscale representation.

There is available a processing system which, in order to prevent overrun, avoids parallel operation by using a memory area which stores one page of image data. This memory is a so-called bitmap memory (or a byte map memory in case of a multilevel image of eight bits per pixel). This is a processing system equipped with a so-called full-page memory. Further, apparatus have appeared which, in order to improve memory efficiency and hold down cost, come equipped with one page of compression memory that utilizes data compression technology.

In any case, with a processing system of this kind, user interface specifications with which a printer apparatus is equipped, namely printer language (PDL) and commands, are converted to more primitive intermediate codes and image data is generated from these intermediate codes. Since the intermediate codes are items of primitive data, the efficiency of processing for generating images can be improved by using hardware as the components for processing these codes.

More specifically, rather than using software to render the individual processing units of intermediate codes such as well-known run-length data and vector data, high-speed rendering is carried out using hardware to thereby raise the above-mentioned band processing speed. This makes it possible to perform printing processing is page units without using one page of image memory. The result is a reduction in total cost.

However, since the units capable of being processed by hardware used to perform high-speed processing in this manner are primitive, the number of such primitive processing units needed to print complicated graphics becomes enormous. Consequently, though the processing of each processing unit can be speeded up, the quantity of processing increases. As a result, there is the possibility that overrun will occur or that the quantity of intermediate codes will exceed the amount of image data to be generated.

In order to deal with such a situation, the time needed to generate one band of image data is calculated from the quantity of print data itself or from the processing time of the individual processing units of intermediate codes logically introduced. If there is a large amount of processed data, rendering time is prolonged and, as a result, the risk of overrun occurs. Accordingly, the occurrence of overrun is predicted as by comparing the time calculated through the above-mentioned method with the data rate (printing speed) of the printer engine.

If occurrence of overrun is predicted, rendering of a band is performed prior to the start of the printing operation, the generated image data is compressed and the compressed data is stored. To realize printing, the compressed data is decompressed at printing time at a processing speed that is in conformity with the data rate of the printer engine. Such rendering processing and processing for the subsequent compression/decompression executed before the start of the printing operation is referred t o as pre-rendering processing. Pre-rendering processing makes it possible to achieve both a reduction in required memory and prevention of overrun. Such processing is complicated, however, and invites a decline in printer throughput.

SUMMARY OF THE INVENTION

An object of the present invention is to provide an image output control method and a printing apparatus in which, when overrun is predicted, pre-rendering processing, namely compression/decompression processing subsequent to image development, is executed in dependence upon an indication from a data supply source which grasps the content of print data, thereby avoiding the risk of overrun, and in which throughput is raised by not executing pre-rendering in regard to print data that will not lead to overrun.

Further, another object of the present invention is to provide a printing apparatus for forming and outputting an image in band units obtained by partitioning a page into bands, comprising: receiving means for receiving print data and designation information which designates an output procedure for the print data; intermediate data generating means for generating intermediate data from the print data, the intermediate data being compressed image data, which is obtained by generating and compressing image data, or an intermediate code, depending upon a designation made by the designation information; image generating means for generating image data from the intermediate data generated by the intermediate data generating means, and storing the image data alternately in two band areas; and output means for printing out the image data, which has been generated by the image generating means, alternately from the two band areas.

Another object of the present invention is to provide a printing system comprising host apparatus for generating print data in page units, and a printing apparatus, which is connected to the host apparatus, for forming and outputting an image in band units obtained by partitioning a page into bands, wherein the host apparatus includes: estimating means for estimating, for each band, necessary time needed to generate image data from print data; and designating means for determining whether the necessary time estimated by the estimating means has exceeded a predetermined value, and generating designation information which, depending upon the determination made, designates either generation of compressed image data or generation of intermediate codes from the print data; and the printing apparatus includes: receiving means for receiving print data and designation information which designates an output procedure for the print data; intermediate data generating means for generating intermediate data from the print data, the intermediate data being compressed image data, which is obtained by generating and compressing image data, or an intermediate code, depending upon a designation made by the designation information; image generating means for generating image data from the intermediate data generated by the intermediate data generating means, and storing the image data alternately in two band areas; and output means for printing out the image data, which has been generated by the image generating means, alternately from the two band areas.

A further object of the present invention is to provide a printing control apparatus for generating print data in page units and causing the print data to be output by a printing apparatus, comprising: estimating means for estimating, for each band, necessary time needed to generate image data from print data; designating means for determining whether the necessary time estimated by the estimating means has exceeded a predetermined value, and generating designation information which, depending upon the determination made, designates either generation and compression of image data or generation of intermediate codes from the print data; and sending means for sending the designation information generated by the designating means to the printing apparatus together with the print data.

Yet another object of the present invention is to provide an image output control method for forming and outputting an image in band units obtained by partitioning a page into bands, comprising: a receiving step of receiving print data and designation information which designates an output procedure for the print data; an intermediate data generating step of generating intermediate data from the print data, the intermediate data being compressed image data, which is obtained by generating and compressing image data, or an intermediate code, depending upon a designation made by the designation information; an image generating step of generating image data from the intermediate data generated at the intermediate data generating step, and storing the image data alternately in two band areas; and an output step of printing out the image data, which has been generated at the image generating step, alternately from the two band areas.

A further object of the present invention is to provide an image output control method for generating print data in page units and causing the print data to be output by a printing apparatus, comprising: an estimating step of estimating, for each band, necessary time needed to generate image data from print data; a designating step of determining whether the necessary time estimated at the estimating step has exceeded a predetermined value, and generating designation information which, depending upon the determination made, designates either generation and compression of image data or generation of intermediate codes from the print data; and a sending step of sending the designation information generated at the designating step to the printing apparatus together with the print data.

Still another object of the present invention is to provide computer readable storage medium for storing a program which includes: a receiving processing step of receiving print data and designation information which designates an output procedure for the print data; an intermediate data generating processing step of generating intermediate data from the print data, the intermediate data being compressed image data, which is obtained by generating and compressing image data, or an intermediate code, depending upon a designation made by the designation information; an image generating processing step of generating image data from the compressed image data or intermediate code, and storing the image data alternately in two band areas; and an output processing step of printing out the generated image data alternately from the two band areas.

Still another object of the present invention is to provide a computer readable storage medium for storing a program for generating print data in page units and causing the print data to be output by a printing apparatus, comprising: a processing step of estimating, for each band, necessary time needed to generate image data from print data; a processing step of determining whether the estimated necessary time has exceeded a predetermined value, and generating designation information which, depending upon the determination made, designates either generation and compression of image data or generation of intermediate codes from the print data; and a processing step of sending the generated designation information to the printing apparatus together with the print data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

Figure 1:
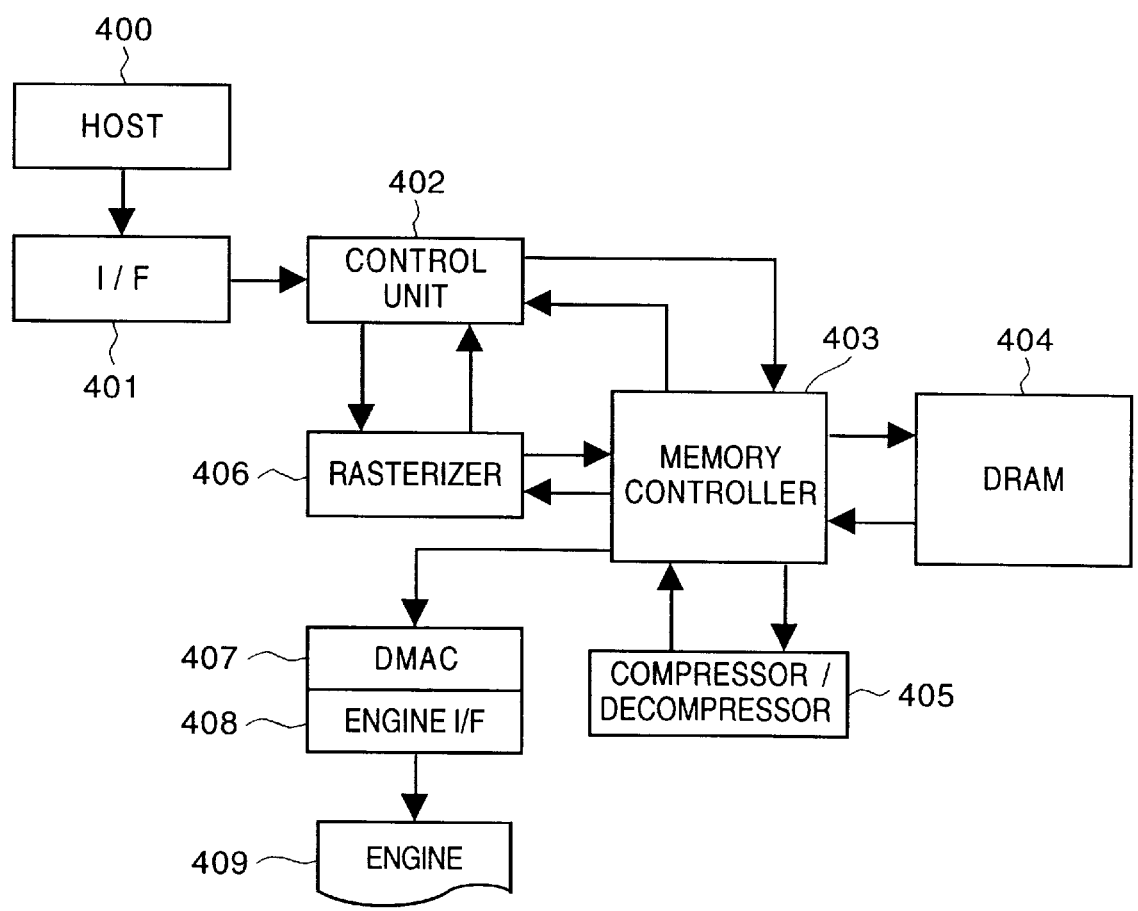
FIG. 1 is a block diagram illustrating the general construction of a printer controller according to a first embodiment of the present invention.
Figure 2:
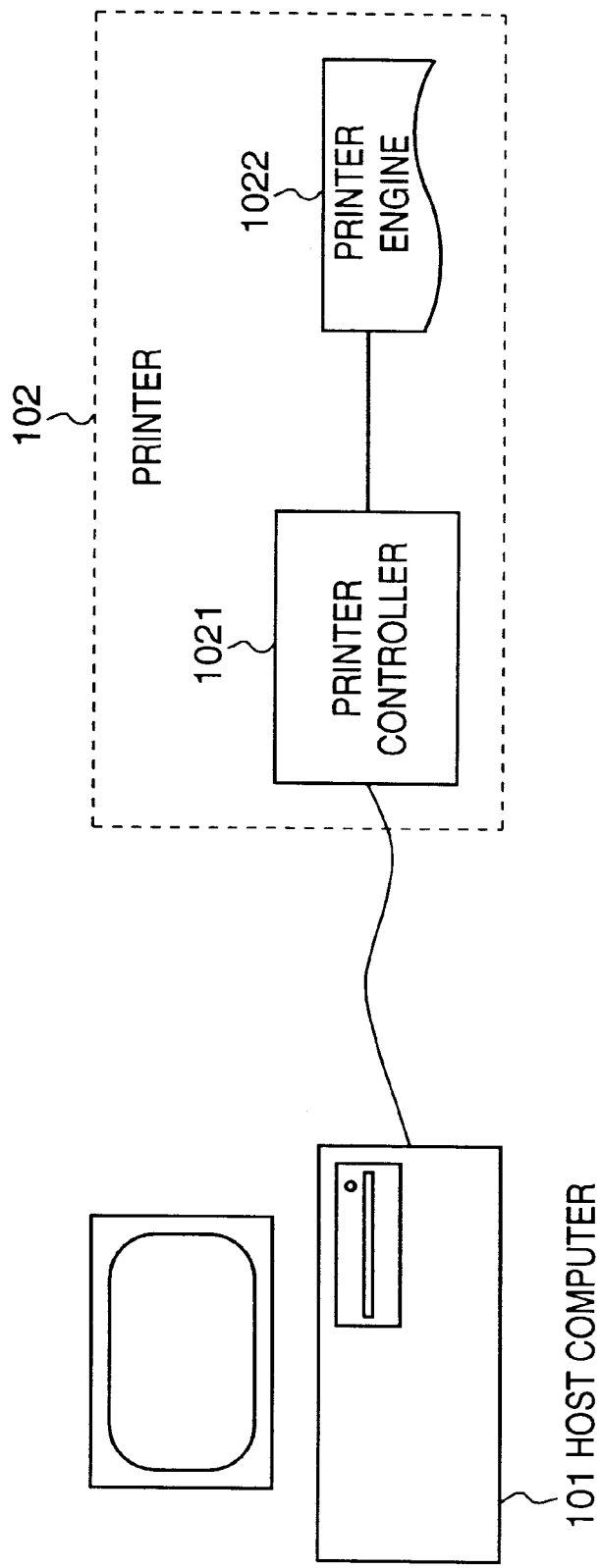
FIG. 2 is a block diagram showing the general construction of a printer system according to the prior art.
Figure 3:
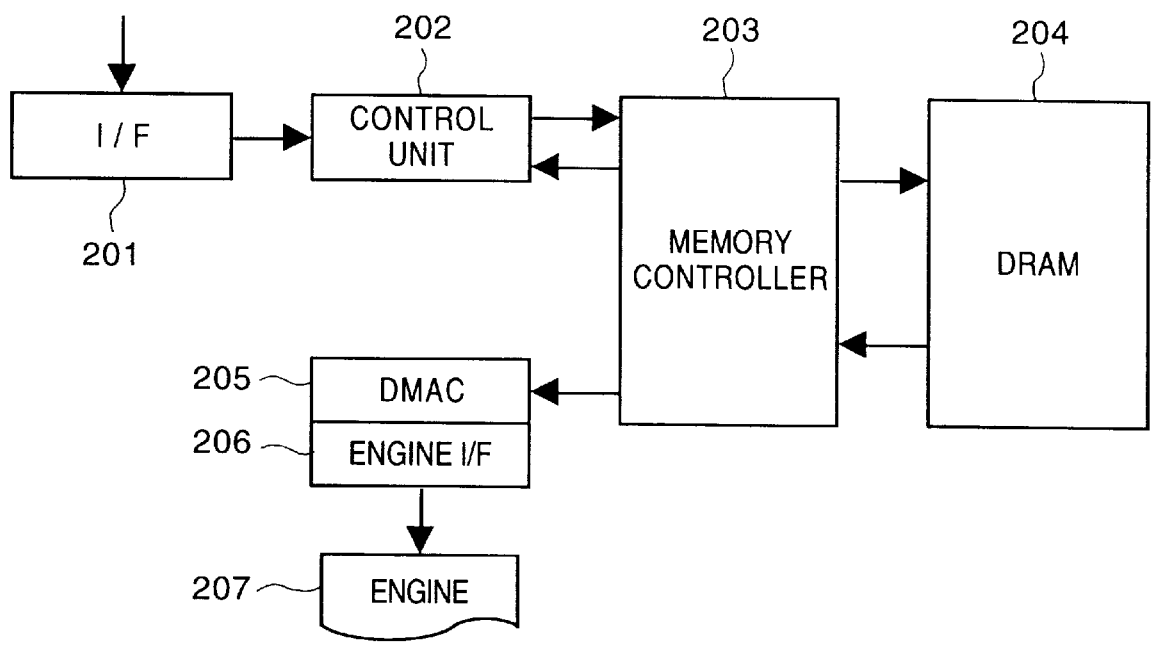
FIG. 3 is a block diagram showing a conventional arrangement for performing band processing.
Figure 4:
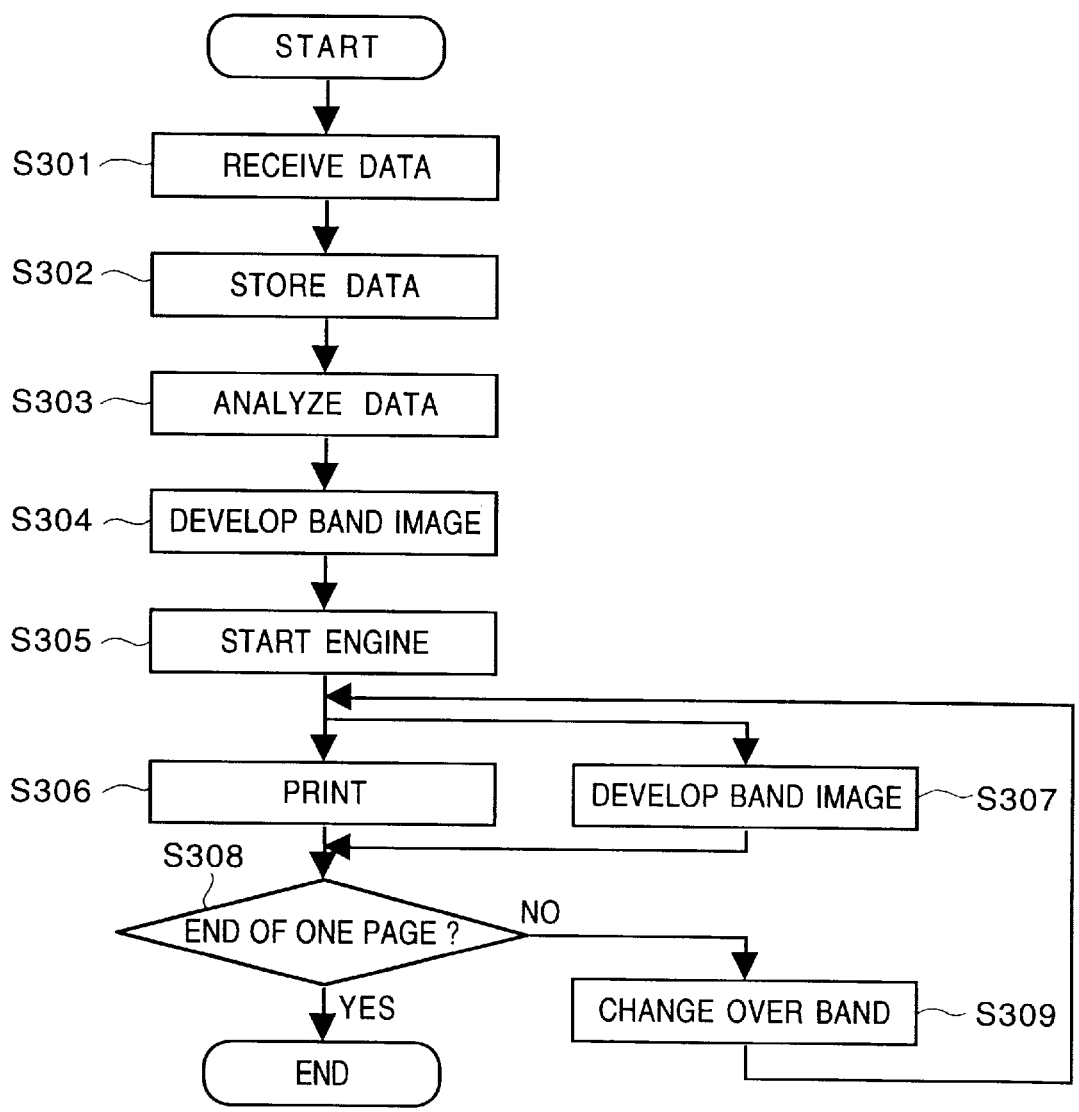
FIG. 4 is a flowchart showing the flow of control for band processing according to the prior art.

FIG. 1 is a block diagram showing the general structure of a printer controller according to a first embodiment of the present invention. The components in the printer controller will now be described.

An interface 401 receives print data from a source 400 for supply of data such as the host computer and performs an exchange of status with the host. More specifically, the interface 401 is a parallel interface, serial interface or network interface, etc.

A control unit 402 controls the overall printer apparatus and executes data processing. More specifically, the control unit 402 uses a processor such as a CPU to control the analysis of print data, the generation of image data and the various component with which the apparatus is provided.

A memory controller 403 controls a DRAM 404, which is a main memory provided within the printer controller. The memory controller 403 controls data access from a rasterizer 406 to a compression/decompression unit 405 and DMAC 407, refreshes the DRAM 404, etc.

The memory 404 is a main memory constituted by a device that is not particularly limited. In this embodiment the memory 404 is the DRAM mentioned above. The DRAM 404 stores image data generated by the control unit 402 in accordance with print data from the host as well as image data which the rasterizer 406 generates from data compressed by the compression/decompression unit 405 (this data also serves as source data to be compressed). The DRAM 404 is used as a working memory area as well.

The compression/decompression unit 405 compresses and decompresses image data. Though the compression/decompression algorithm per se is not particularly limited, here the algorithm is one which makes it possible to compress image data at a compression ratio that enables a reduction in memory required. In a case where compressed data is decompressed, the decompression should be possible in a manner that conforms to the data transfer speed of the engine. Specific examples of compression algorithms are JPEG and JBIG algorithms.

The rasterizer 406 actually generates image data. The rasterizer 406 generates image data in response to a command from the control unit 402. Alternatively, the rasterizer 406 generates image data at high speed by hardware or software from an intermediate language generated by the control unit 402 and stored temporarily in the DRAM 404. The intermediate language is a primitive language, which is capable of being analyzed by the rasterizer 406, generated on the basis of print data received from the host computer 400.

The DMAC 407 is provided so that the printer controller may send a printer engine 409 image data at the time of printing. The image data is that generated by the rasterizer 406 and then stored in the DRAM 404 or that decompressed by the compression/decompression unit 405 and then stored in the DRAM 404. The DMAC 407 operates in accordance with the setting of the control unit 402.

An engine interface 408 sends the printer engine 409 image data output via the DMAC 407. Various settings are implemented by the control unit 402.

The printer engine 409 fixes the image data, which has been output by the engine interface 408, on a medium such as paper, thereby realizing printing. This embodiment presumes that the engine is a page printer engine typified by a laser printer.

FIGS. 5A, 5B and 5C are diagrams showing examples of instruction formats by which the data supply source instructs the printer controller whether or not to perform control of rendering and compression/decompression of generated image data, namely pre-rendering processing. Though there is no particular limitation upon these formats, three examples thereof will be cited. First, in FIG. 5A, the format includes a compression/decompression processing designating instruction field 501 which designates compression/decompression processing, a data length field 502 indicating the data length of a data group to undergo compression/decompression processing, and a draw data field 503 in which image data having a data length indicated by the data length field 502 is stored. The format shown in FIG. 5B includes a compression/decompression processing designating instruction field 504 which designates compression/decompression processing, an instruction count field 505 which indicates the number of draw instructions that follow the compression/decompression processing designating instruction field 504, and an draw instruction group 506 which actually implements compression/decompression processing. The format shown in FIG. 5C includes a compression/decompression processing start instruction field 507 which designates the start of compression/decompression processing, a draw instruction group 508 which includes draw instructions for actually implementing compression/decompression processing, and a compression/decompression processing end instruction field 509 which indicates the end of compression/decompression processing. The contents of the image data field 503, image instruction group 506 and image instruction group 508 may be considered to be substantially the same.

The printer analyzes the draw data or draw instruction group in image units (e.g. per each draw instruction) that are for generating characters, graphics or images included in the data or instructions, and generates an image in accordance with this analysis. In order to speed up draw processing, there are also instances where intermediate codes are generated and then an image is generated from the intermediate codes. Each draw unit or an image generated from each draw unit shall also be referred to as an "object" below. Further, since pre-rendering processing is accompanied by compression/decompression processing, the designation of pre-rendering processing shall also be referred to simply as designation of compression/decompression processing or as designation of compression/decompression control.

Figure 6:
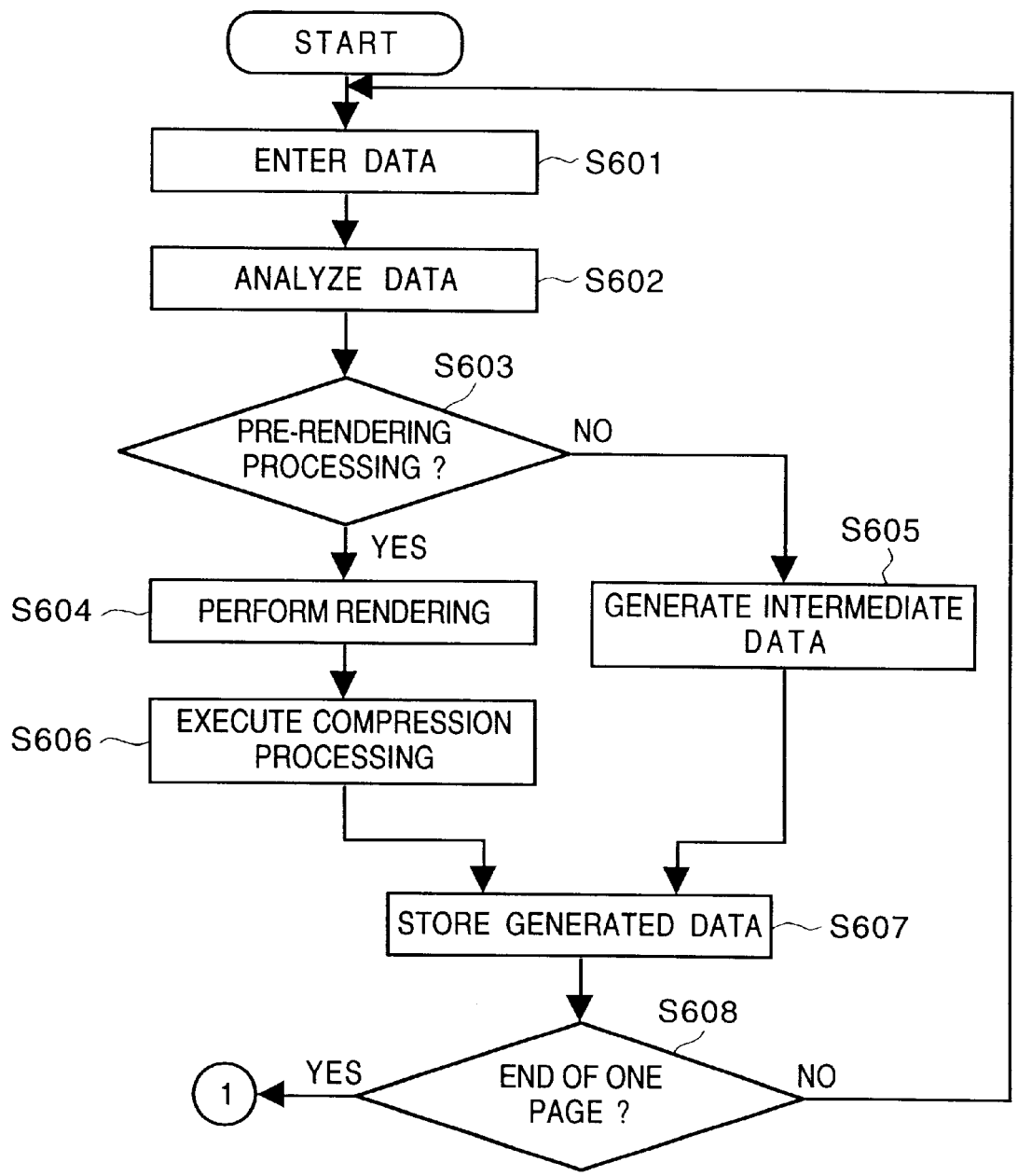
FIG. 6 is a flowchart showing operation in a case where a data supply source instructs a printer controller in regard to processing content in band units according to the first embodiment.
Figure 7:
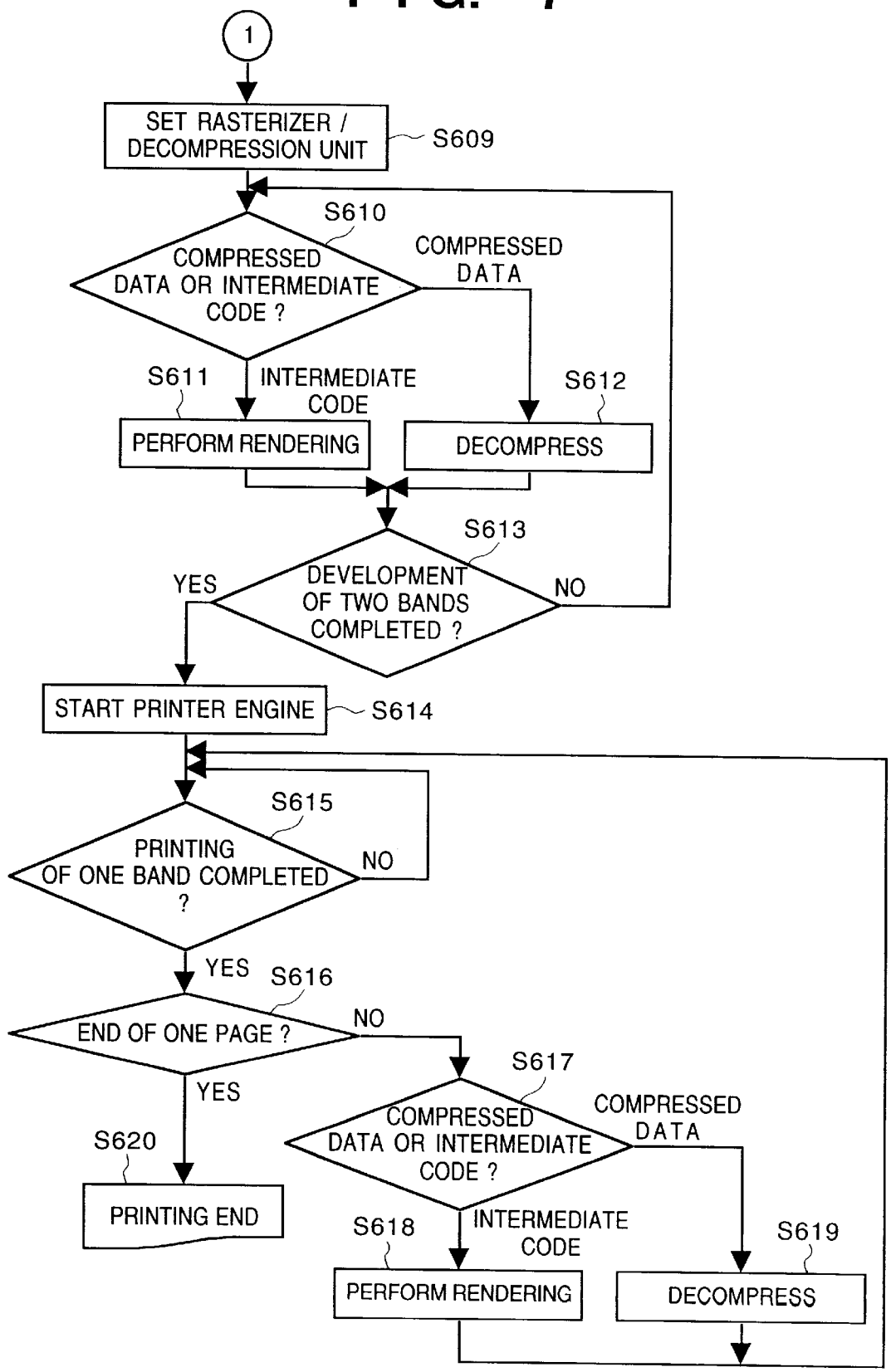
FIG. 7 is a flowchart, which is a continuation of the flowchart of FIG. 6, showing operation in a case where a data supply source instructs a printer controller in regard to processing content in band units according to the first embodiment.

FIGS. 6 and 7 are flowcharts illustrating the flow of operation according to the embodiment set forth above and will be used to describe the flow of operation. The flowcharts constitute the procedure of processing executed by the control unit 402 of FIG. 1 in accordance with instructions from the host.

First, print data, which is code data specific to the printer or data described in page description language for the printer, is received from the data supply source such as the host computer 400 and the received data is stored in the DRAM 404 via the memory controller 403 (step S601). In order to compensate for a difference in speed between the communication speed of the interface and the data processing speed of the printer, the received data generally is buffered temporarily in a reception buffer provided in the DRAM 404. The processing of step S601 corresponds to this operation.

Next, the buffered input data is analyzed and converted to internal data suited to band processing (step S602). Specifically, the processing of this step corresponds to an operation for partitioning one page of draw instructions into band units in order to perform band control.

Next, on the basis of the results from the analysis of the input data, it is determined whether a designation for performing compression/decompression processing of the kind shown in FIGS. 5A through 5C has been issued by the data supply source in regard to a band of interest (step S603). The program proceeds to step S604 if the designation has been issued and to step S605 if it has not.

If it is found at step S603 that the compression/decompression processing designation has been issued, then image data is generated, using the rasterizer 406, from the draw instruction group designated as the object of compression/decompression, and the generated image data is stored in the DRAM 404 via the memory controller 403 (step S604).

If rendering in regard to the draw instruction group that is the object of compression/decompression is finished at step S604, the control unit 402 makes various settings in regard to the compression/decompression unit 405, such as source data to be compressed and compressed data storage areas, and then starts up the compression/decompression unit 405 to begin compression processing (step S606).

The compression/decompression unit 405 reads the image data, which was generated at step S604, out of the DRAM 404 via the memory controller 403, compresses the data and then stores the compressed data in the DRAM 404 via the memory controller 403 (step S607).

If it is found at step S603 that the compression/decompression processing designation has not been issued, then the control unit 402 creates intermediate data (step S605) for performing high-speed rendering after the start of the printing operation. The generated intermediate data is stored in the DRAM 404 via the memory controller 403 (step S607).

In this embodiment, band processing is executed at the time of printing. Band processing, though touched upon earlier, will now be described in greater detail.

At least two draw band memory areas for storing bands obtained by partitioning a page in the raster scan direction are allocated within the DRAM 404. A memory having a full bitmap area for one page is not used. While the image data that has been stored in one band memory area is being printed, image data is simultaneously generated in the other band memory area using this period of time. Compression/decompression processing also is performed in band units without using a full memory (bitmap or byte map) of one page. To accomplish this, a data conversion operation is performed to convert the data received from the host computer to intermediate image codes or compressed data capable of being processed in band units. Further, in order to simplify the description, it is assumed in this embodiment that whether or not compression/decompression processing is to be executed is designated in band units. Other cases will be described later.

It is determined at step S608 whether one page of intermediate codes or compressed data has been generated as the intermediate data necessary at the time of printing. The program proceeds to step S609 if the answer is "YES" and returns to step S601 if the answer is "NO" so that the above-described processing may be repeated until one page of intermediate data is generated. In order to simplify the description, the flowchart is written such that the program returns to step S601 if one page of intermediate data has not yet been generated at step S608. However, this does not impose a limitation upon the invention. In actuality, there are instances where a data input/buffering queuing operation is managed by separate tasks. In such case a task for judging the condition at step S608 and a task for queuing data from the data supply source at step S601 using an external interface would run separately. The point to which a return would be effected from the condition judging task of step S608 would be step S602, namely the step of reading the queued input data from the buffer and analyzing the data.

Next, the control unit 402 makes initial settings for the rasterizer 406 and compression/decompression unit 405 when printing is performed (step S609). More specifically, the compression/decompression unit 405 is set in the decompression mode.

Next, the control unit 402 determines, from the one page of accumulated intermediate codes or compressed data of each band, whether one band at the beginning of the page is compressed data or an intermediate code (step S610). The program proceeds to step S612 in case of compressed data and to step S611 in case of an intermediate code.

If an intermediate code is discriminated at step S610, then the control unit 402 performs the first band of image data generation using the rasterizer 406 (step S611). In this embodiment, a hardware-based rasterizer is used for the purpose of raising processing speed. To this end, the initial setting of the rasterizer 406 is made at step S609 and the rasterizer 406 in FIG. 1 is drawn as an independent block. However, this does not impose a limitation upon the invention and it is possible to use a software-based rasterizer according to which the control unit 402 analyzes the intermediate codes and generates image data.

In a case where the rasterizer 406 is constructed of hardware, the control unit 402 sets parameters necessary for the rasterizer 406, and the rasterizer 406 reads out the intermediate codes, which have already been generated and stored in the DRAM 404, via the memory controller 403, generates image data in accordance with the intermediate codes and stores the image data in the DRAM 404 via the memory controller 403.

If compressed data is discriminated at step S610, the control unit 402 sets various parameters in the compression/decompression unit 405 and then one band of image data is decompressed (step S612). More specifically, the compressed data already generated and stored in the DRAM 404 is read in by the compression/decompression unit 405 via the memory controller 403, the compression/decompression unit 405 decompresses this compressed image data and stores the decompressed image data in the DRAM 404 again via the memory controller 403. It should be noted that the manner in which data is read and stored at steps S611, S612 is not particularly limited. It is assumed here that two-channel DMA transfer for input and output directions is possible in the rasterizer 406 and compression/decompression unit 405.

Next, the control unit 402 determines whether image data has been generated within the two band memories (step S613), with the program returning to step S610 if the answer is "NO". More specifically, two bands of image data to be printed are generated in the DRAM 404 as a result of this step. Thus, with this apparatus, in order to maximize avoidance of overrun even in a case where output processing is performed in band units, two bands of image data are created in advance within limits allowed by the capacity of the DRAM 404.

Next, the control unit 402 makes various settings in the DMAC 407 for the purpose of sending the engine interface the band image data that has been generated by the above-described processing, and starts up the printer engine 409 (S614).

The started engine 409 sends various synchronizing signals to the engine interface 408 and, on the basis of the synchronizing signals, the DMAC 407 starts sending one band of image data that has been stored in the DRAM 404 to the printer engine 409 via the engine interface 408. The control unit 402 waits for the end of transmission of one band of image data (step S615).

If the transmission of one band of image data is finished, the control unit 402 determines whether one page of data has been sent, i.e. whether the printing of one page has been completed (step S616). More specifically, if the printing of a page is in progress, the control unit 402 determines whether an intermediate code or compressed data of a band to be printed next still remains as one page of data. Setting of the DMAC 407 is performed again in order to print, in parallel with subsequent processing, data that still remains in memory as intermediate codes or compressed data. Accordingly, in this embodiment, two band memories are provided. The DMAC 407, therefore, is set in such a manner that the engine 409 will be sent the content of the band memory area storing data already generated by the above-described processing but not yet sent to the engine. The setting need not necessarily be performed by the control unit 402.

More specifically, if the printer controller determines, in parallel with the development of images in the band memories, that one band buffer has become empty and that there is still data to be printed from the same page, the printer controller changes over the band buffer that is the object of output and outputs image data to the engine from the other band buffer.

There is no particular limitation upon the operation for resetting the DMAC 407. A software interrupt may be applied and the control unit 402 may perform the resetting operation after the band image data is sent. Alternatively, hardware may perform the resetting operation after one band of image data is sent. In either case, a necessary condition is that overrun not occur in accordance with the data rate of the engine 409.

If it is determined at step S616 that the printing of one page has not been completed, and if an intermediate code or compressed data resides in the DRAM 404 as the next band of data of this page, then it is determined whether this data is intermediate data or compressed data (step S617).

If an intermediate code is discriminated at step S617, then the control unit 402 performs various settings in order to generate image data from this intermediate code and rendering is performed by the rasterizer 406 (step S618). The rendering operation and data path are similar to those mentioned in the rendering operation of step S611, and the storage location of the generated image data is the band buffer in the DRAM 404 that has been emptied by previous transmission of the data.

If compressed data is discriminated at step S617, then the control unit 402 sets the compression/decompression unit 405 for generating the next band of image data and causes the unit 405 to decompress the compressed data (step S619). The rendering operation of step S618 is similar to that of step S611 and the decompression operation of step S619 is similar to that of step S612.

When the generation of one band of image data at step S618 or step S619 is finished, the program returns to step S615 and the processing of steps S615, S616, S617 and S618 or S619 is performed. Meanwhile, the DMAC 407 sends the band image data that has been stored in the DRAM 404 to the engine 409 via the engine interface 408 by means of hardware. Whether the printing of one page has been completed is determined at step S616. It is presumed that the total length of time for the processing of steps S617 and S618 or S619 that follow the step S616 is shorter than the time needed to send the image data from within the band buffer. In other words, the data rate of the memory, the data rate of rendering/decompression and the band buffer capacity are decided and each component is controlled in such a manner that overrun will not occur.

The processing of steps S616~S619 is repeated until one page of image data is sent to the printer engine, i.e., until the printing of one page is finished (step S620).

By performing printout through the procedure described above, the method of printing obtainable on the printer side can be specified by the host. That is, a first printing method is an intermediate code processing method in which intermediate codes are generated and output is performed in band units in parallel with the generation of images, in band units, from the intermediate codes. A second printing method is a pre-rendering processing method in which one page of image data is developed in band units and then compressed, the compressed data is subsequently decompressed in band units and, while this is performed, output is performed in band units in parallel this operation.

One of these two methods can be specified from the host computer. It is easy for the host computer to recognize the kind of data that has been sent to the printer. Since ordinary print data can be output in a processing time that corresponds to the output rate of the engine, the first method is used for this data. With the first method, however, there is the danger that overrun will occur. Accordingly, the host computer estimates the possibility of overrun and, if it construes that overrun will occur, performs output using the second method, which is more reliable but takes more time.

Figure 16:
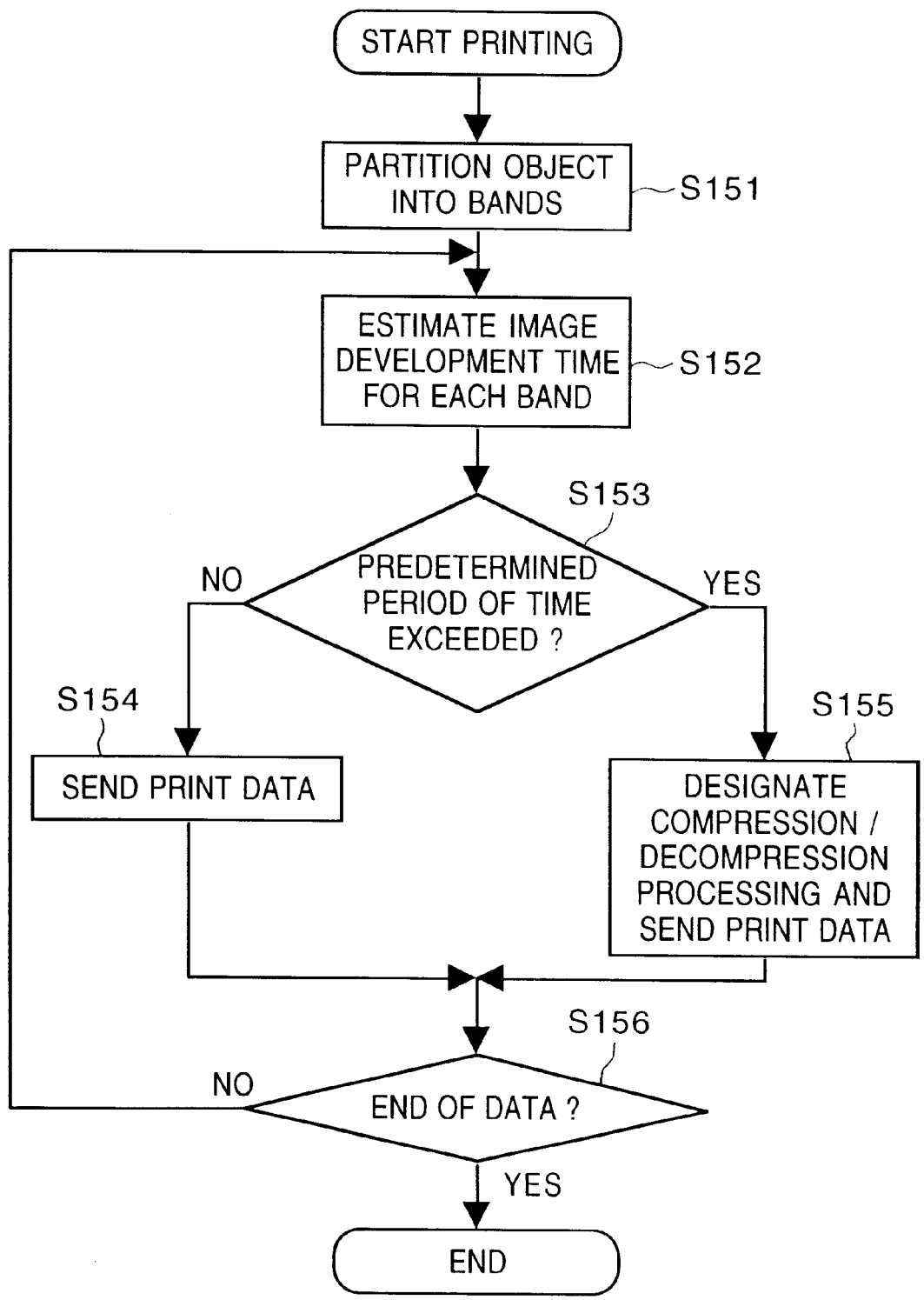
FIG. 16 is a flowchart of a procedure through which a host computer decides whether to designate compression/decompression processing or intermediate code processing.

FIG. 16 is a flowchart showing the procedure of print processing executed by the host computer 400. This procedure is executed as part of a program module, which is referred to as a printer driver, for controlling the printer.

The host computer 400 partitions the object that is to be printed into bands identical with those in the printer (step S151). Since the object ordinarily includes printing position as data, partitioning of the object into bands is easy if the addresses at the beginning and end of each band constituting the page are known.

Next, at step S152, the host computer 400 calculates, on a per-band basis, the time needed to convert the included object to image data. For example, an object may be an image, a character or a graphic, etc. The host computer 400 decides the basic time for each and every object in advance and multiplies the basic time by the size of the object, thereby making it possible to approximately calculate the time required.

Next, at step S153, the host computer 400 determines whether the time needed to generate the image calculated per band has exceeded a predetermined value. The predetermined value is a length of time required to read one band of image data out of the band buffer in order that the printer may print out one band of image data. Though it will depend upon the accuracy of the value calculated at step S152, it is required that some allowance for safety be provided in order to positively prevent overrun. Overrun is a risk if the predetermined period of time is exceeded. For this reason, print data of the particular band is sent to the printer at step S155 along with a command (see FIGS. 5A~5C) designating compression/decompression processing. As a result, printing is carried out in accordance with the second method set forth above. If the predetermined period of time is not exceeded, then, in regard to this band, ordinary print data devoid of a compression/decompression instruction is sent to the printer. The printer responds by performing printing in accordance with the first method mentioned above.

Thus, overrun can be positively prevented and only bands for which the occurrence of overrun is a possibility can be subjected to pre-rendering processing. This makes it possible to minimize a decline in printing speed caused by pre-rendering processing.

Second Embodiment

The first embodiment has been described in regard to a case where pre-rendering is designated by the data supply source on a per-band basis. Such an arrangement makes it possible to obtain some degree of improvement in total performance inclusive of the performance of the data supply source. In accordance with the second embodiment, the host computer designates a pre-rendering processing method of the kind shown in FIGS. 5A–5C as well as a conventional intermediate code processing method for the objects in one band. More outstanding effects can be obtained if the printing apparatus executes processing, in the manner described below, in regard to two types of data for which different processing methods have been designated.

Figures 8A, 8B:
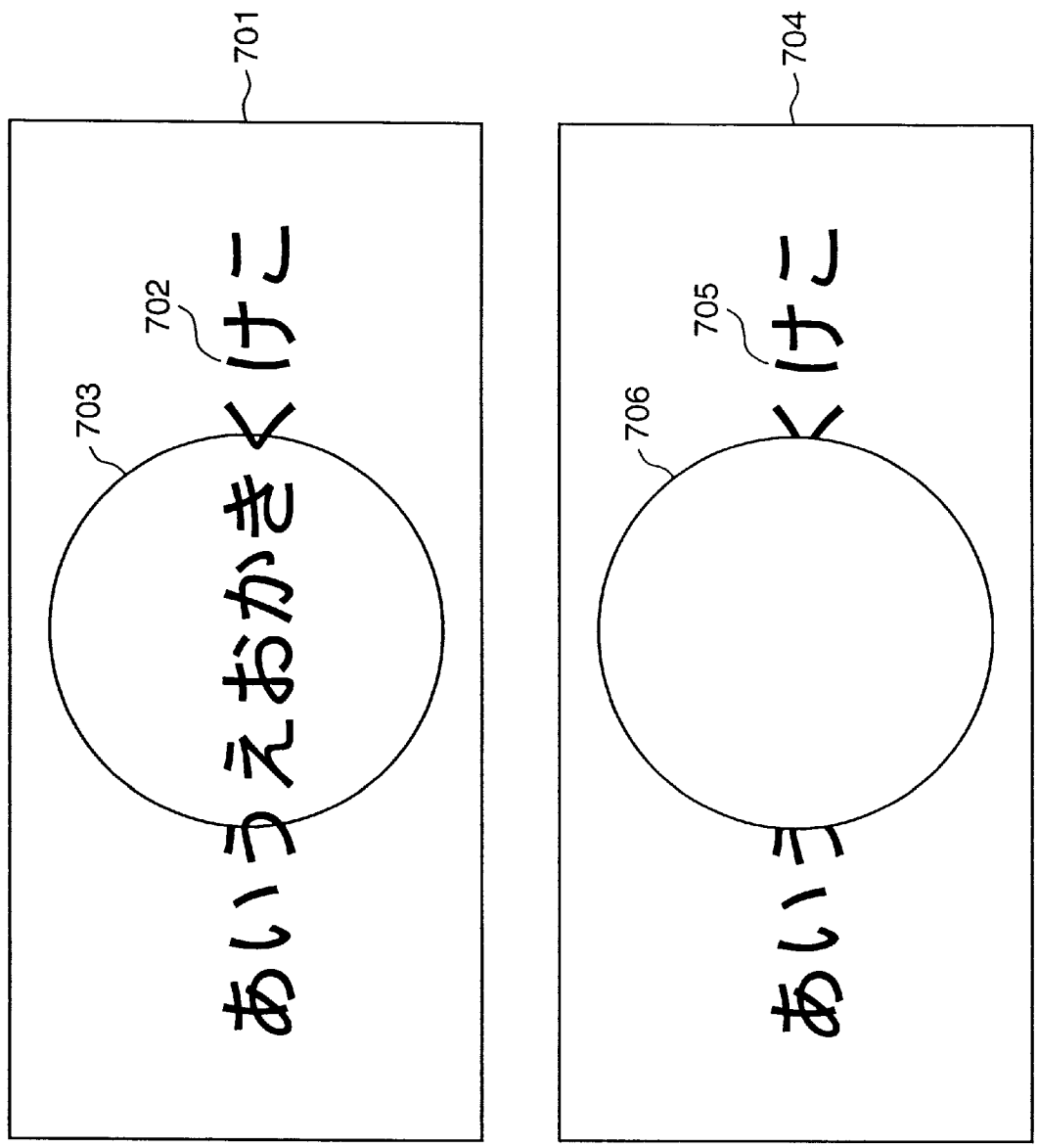
FIGS. 8A and 8B are diagrams showing examples of cases in which a portion which undergoes processing based upon intermediate data and a generated image based upon compression/decompression processing are superimposed on paper.

FIGS. 8A and 8B are diagrams showing examples of images in which character data for which intermediate code processing has been designated and image data for which compression/decompression processing has been designated are mixed in one and the same band. Areas 701 and 704 each indicate a band in which data for generating an image from an intermediate code and image data for which pre-rendering has been designated are mixed. Objects 702, 705 are character portions generated by intermediate code processing, and objects 703, 706 are image portions subjected to pre-rendering processing. FIG. 8B is an example in which character is written over an image in an area in which character data for which intermediate code processing has been designated and image data for which compression/decompression processing has been designated are mixed. Conversely, FIG. 8A is an example of an area in which an image portion is written over character_in the band.

A band which includes areas of mixed data as shown in FIGS. 8A, 8B is subjected to pre-rendering as the simplest measure for dealing with such data. Specifically, the entirety is developed as an image and then subjected to compression/decompression processing. In general, however, with pre-rendering processing, which involves compressing and saving image once rendering has been carried out, intermediate codes are actually used as the original data that is necessary for rendering, and the rendering time needed to develop an intermediate code into an image has an adverse influence on throughput. For this reason, avoiding pre-rendering to the greatest extent possible is advantageous in terms of processing efficiency.

In order to deal with this, only an area which includes mixed data as shown in FIGS. 8A, 8B is subjected to pre-rendering processing. That is, for an area that includes data for which pre-rendering processing has been designated, all objects included in this area are pre-rendered. Intermediate data is generated only in case of an area that does not include data for which pre-rendering processing has been designated. Adopting this expedient makes it possible to prevent, to the maximum degree, a decline in processing efficiency due to pre-rendering, and to avoid an increase in memory capacity required.

Figure 10:
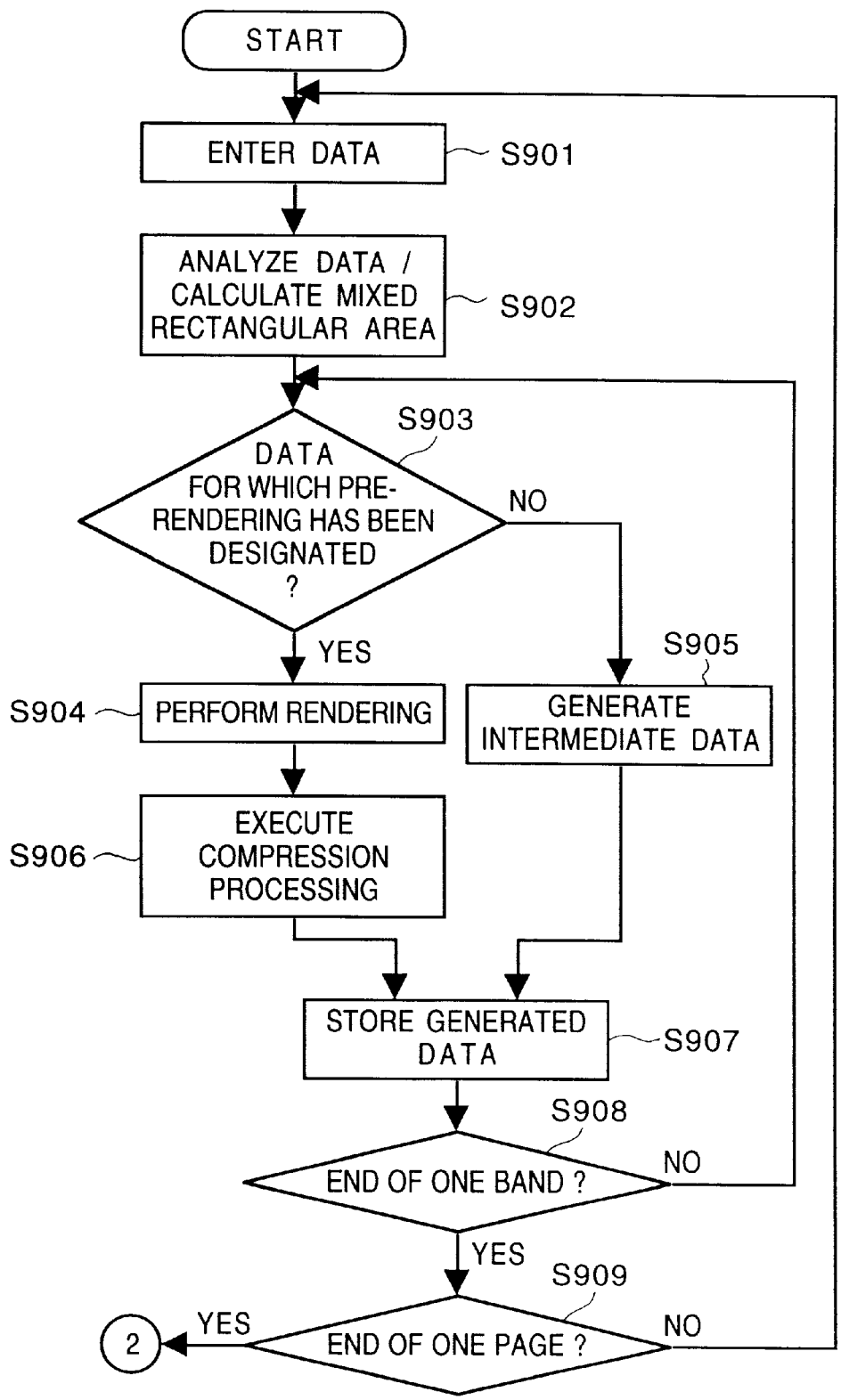
FIG. 10 is a flowchart showing the flow of processing in a case where a data supply source instructs a printer controller in regard to intermediate code processing and compression/decompression processing at object drawing.
Figure 11:
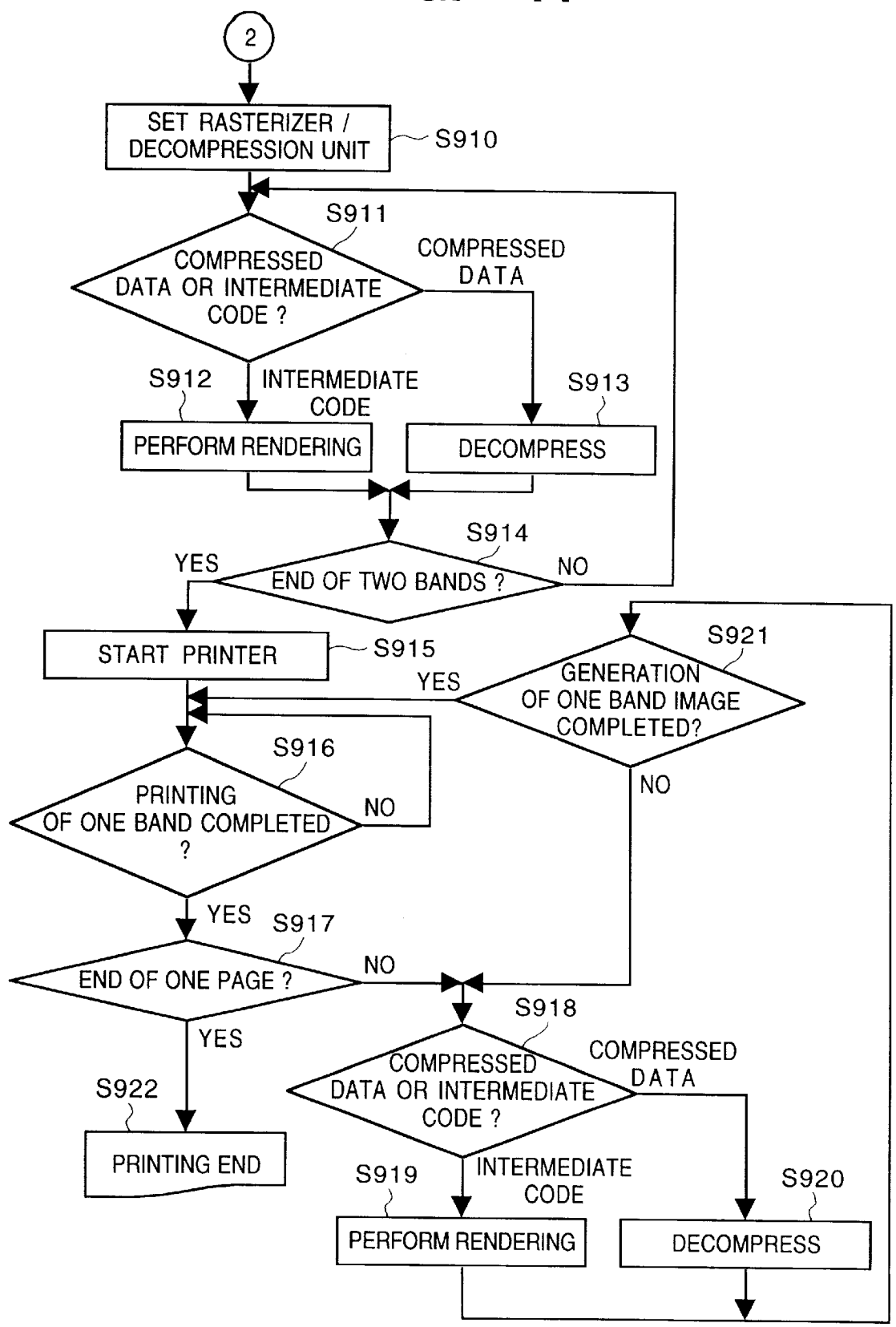
FIG. 11 is a flowchart, which is a continuation of the flowchart of FIG. 10, showing the flow of processing in a case where a data supply source instructs a printer controller in regard to intermediate code processing and compression/decompression processing at object drawing.

The flow of this operation will be described with reference to the flowcharts of FIGS. 10 and 11. The procedure indicated by these flowcharts is executed by the printer shown in FIG. 1.

First, code data specific to the printer or print data described in PDL or the like is received from the data supply source such as the host computer 400 and the controller 402 stores the received data in the DRAM 404 via the memory controller 403 (step S901). In order to compensate for a difference in speed between the communication speed of the interface and the data processing speed, the received data generally is buffered temporarily in the reception buffer provided in the DRAM 404. The processing of step S901 corresponds to this operation.

Figure 9A:
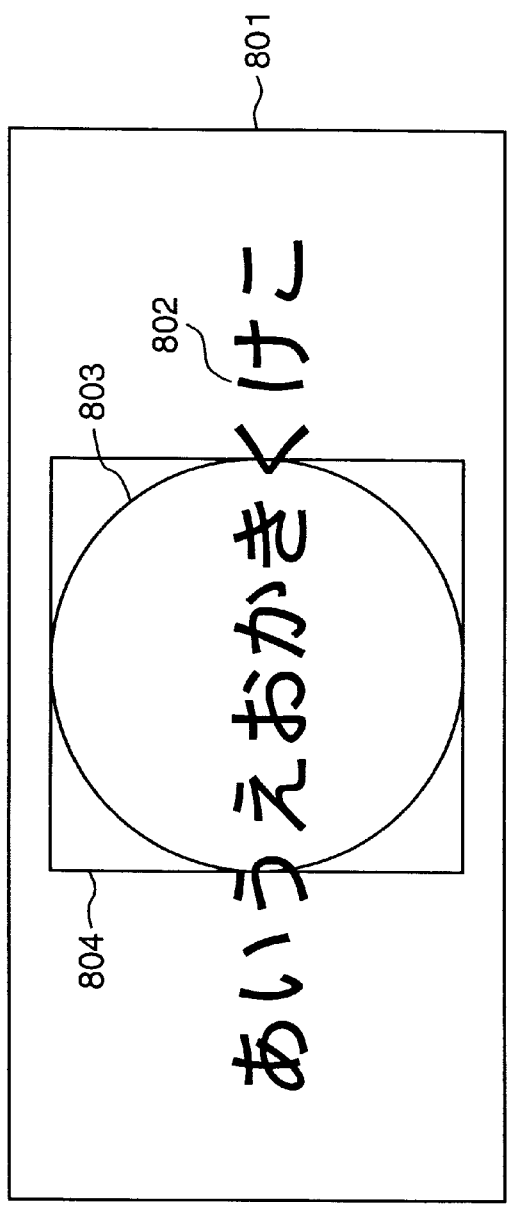
FIGS. 9A and 9B are diagrams showing examples of cases in which a portion which undergoes processing based upon intermediate data and a generated image based upon compression/decompression processing are superimposed on paper, these diagrams illustrating the minimum limits of rectangular areas in which overlap occurs.
Figure 9B:
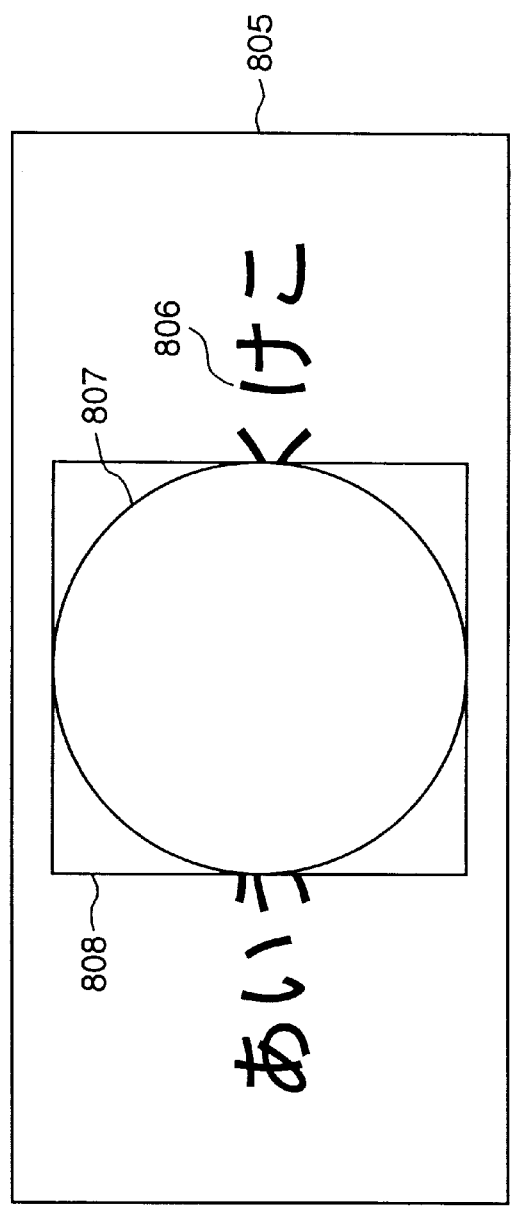

Next, the control unit 402 analyzes the buffered input data and converts the data to internal data suited to band processing. At the same time, the control unit 402 calculates rectangular areas in which an object to undergo intermediate code processing and an object to undergo pre-rendering processing overlap, as shown in FIGS. 9A, 9B (step S902). More specifically, following the operation for dividing one page of draw instructions into band units in order to perform band control, the control unit 402 calculates rectangular areas 804, 808 in which images processed by each of the above-described methods overlap in each band. FIGS. 9A, 9B are diagrams obtained by adding, to FIGS. 8A, 8B, rectangular areas in which an object to undergo intermediate code processing and an object to undergo pre-rendering processing overlap. Bands 801 and 805 are bands in which character data for which intermediate code processing has been designated and image data for which pre-rendering processing has been designated are mixed. Objects 802, 806 are character data which has undergone intermediate code processing, and objects 803, 807 are image data for which pre-rendering processing has been designated. FIG. 9B is a diagram showing the manner in which characters are overwritten by an image in area 808 wherein image data and character data are mixed in a certain band. FIG. 9A is a diagram showing the manner in which an image is overwritten by character in area 804. It should be noted that a rectangular area in which image data is generated by these two methods is referred to as a compound area.

Next, on the basis of the results from the analysis of the input data, the control unit 402 determines whether data to undergo processing is print data for which pre-rendering processing has been designated and whether a compound area has been calculated at step S902 (step S903). The program proceeds to step S904 if pre-rendering processing has been designated or if a mixed area has been calculated. Otherwise, the program proceeds to step S905.

If it is found at step S903 that pre-rendering processing has been designated or that a mixed area has been calculated, then, on the basis of an image instruction group that has been received along with the pre-rendering processing designation or on the basis of data within the calculated compound area, the control unit 402 performs rendering using the rasterizer 406 and stores generated image data in the DRAM 404 via the memory controller 403 (step S904).

When rendering at step S904 is completed, the control unit 402 makes various settings in regard to the compression/decompression unit 405, such as designation of compression processing and setting of source data to be compressed and compressed data storage areas, and then starts up the compression/decompression unit 405 to begin compression processing (step S906).

The compression/decompression unit 405 reads the image data, which was generated at step S604, out of the DRAM 404 via the memory controller 403, compresses the data and then stores the compressed data in the DRAM 404 via the memory controller 403 (step S907).

If it is found at step S903 that pre-rendering has not been designated, then the control unit 402 creates intermediate codes (step S905) for performing high-speed rendering after the start of the printing operation. The generated intermediate codes are stored in the DRAM 404 via the memory controller 403 (step S907).

Next, the control unit 902 determines whether the processing of one band has been completed, with the program returning to step S903 if the answer is "NO" (step S908). In this loop, therefore, one band of intermediate data in which intermediate codes and compressed image data are mixed is generated.

When image source data necessary at the time of printing has been generated as intermediate codes or compressed data through the processing up to step S908, the control unit 402 determines whether one page of this image data has been generated (step S909). If one page of intermediate data has been generated, the program proceeds to step S910. Here the control unit 402 sets the rasterizer 406 or compression/decompression unit 405 in dependence upon subsequent processing. If one page of intermediate data has not been generated, then the program proceeds to step S405 and the above-described processing is repeated until one page of intermediate data is generated. In order to simplify the description, the flowchart is written such that the program returns to step S901 if one page of intermediate data has not yet been generated at step S909. However, this does not impose a limitation upon the invention. In actuality, there are instances where a data input/buffering queuing operation is managed by separate tasks. In such case a task for judging the condition at step S909 and a task for queuing data from the data supply source at step S901 would run separately. The point to which a return would be effected from the condition judging task of step S909 would be step S902, namely the step of reading the queued input data from the buffer and analyzing the data.

Next, the control unit 402 starts processing regarding the first band at the beginning of a page based upon one page of accumulated intermediate codes or compressed data of each band and determines whether the initial processing unit is compressed data or an intermediate code (step S911). The program proceeds to step S913 in case of compressed data and to step S912 in case of an intermediate code. The "processing unit" mentioned here signifies data corresponding to individual objects, such as individual intermediate codes or compressed image data. Further, since this data is data generated in intermediate fashion in the process of generating the image data, it may also be referred to as intermediate data.

If an intermediate code is discriminated at step S911, then the control unit 402 generates image data of one processing unit using the rasterizer 406 (step S912). More specifically, in this embodiment, use is made of a rasterizer implemented by hardware for the purpose of raising processing speed. However, this does not impose a limitation upon the invention and the control unit 402 may analyze the intermediate codes and generate image data.

In a case where the rasterizer 406 is constructed of hardware, the control unit 402 sets parameters necessary for the rasterizer 406, and the rasterizer 406 reads out the intermediate codes, which have already been generated and stored in the DRAM 404, via the memory controller 403, generates image data in accordance with the intermediate codes and stores the image data in the DRAM 404 via the memory controller 403.

If compressed data is discriminated at step S911, the control unit 402 sets various parameters in the compression/decompression unit 405 and the compression/decompression unit 405 then decompresses one band of image data (step S913). More specifically, the compressed data already generated by the above-described processing and stored in the DRAM 404 is read in and decompressed by the compression/decompression unit 405 via the memory controller 403. The decompressed image data is stored in the DRAM 404 again via the memory controller 403. It should be noted that the manner in which data is read and stored at steps S912, S913 is not particularly limited. It is assumed here that two-channel DMA transfer for input and output directions is possible in the rasterizer 406 and compression/decompression unit 405. Further, the data that will be decompressed is data in an area in which there is an object for which pre-rendering has been designated by the data supply source or data in an area in which an object for which pre-rendering has been designated and an object for which intermediate code processing has been designated are mixed.

Next, the control unit 402 determines whether image data generation has been carried out in regard to the two leading bands (step S914), with the program returning to step S911 if the answer is "NO". More specifically, two bands of image data that should be printed are generated in the DRAM 404 by this operation. This is a process for avoiding overrun to the maximum degree in view of the fact that band control is performed in the apparatus of this embodiment. It should be noted that whereas image data is generated in band units at steps S611, S612 of FIG. 7 in the first embodiment, image generation processing is carried out in the smallest processing units at steps S912, S913 in FIG. 11 of this embodiment. That is, with regard to intermediate codes, images are generated in object units. With regard to compressed data, images are decompressed for each collection of compressed data. The same is true also with regard to steps S919, S920, described later.

Next, the control unit 402 makes various settings in the DMAC 407 for the purpose of sending the engine interface the band image data that has been generated by the above-described processing, and starts up the printer engine 409 (S614).

The started engine 409 sends various synchronizing signals to the engine interface 408 and, on the basis of the synchronizing signals, the DMAC 407 starts sending one band of image data that has been stored in the DRAM 404 to the printer engine 409 via the engine interface 408. The control unit 402 waits for the end of transmission of one band of image data (step S916).

If the transmission of one band of image data is finished, the control unit 402 determines whether one page of data has been sent, i.e. whether the printing of one page has been completed (step S917). More specifically, if the printing of a page is in progress, the control unit 402 determines whether an intermediate code or compressed data of a band to be printed next on the same page still remains. During the development, into image data, of data that still remains in memory as intermediate codes or compressed data, setting of the DMAC 407 is performed again in order to print the data in parallel with this processing. This setting is carried out in such a manner that the engine 409 will be sent the content of the band memory area storing data already generated by the above-described processing but not yet sent to the engine. The setting need not necessarily be performed by the control unit 402. The resetting operation is not particularly limited. A software interrupt may be generated at the moment sending of the band image data ends and the control unit 402 may take this opportunity to perform the resetting operation. Alternatively, hardware may perform the resetting operation after one band of image data is sent. In either case, a necessary condition is that overrun not occur in accordance with the data rate of the engine 409.

If it is determined at step S916 that the printing of one page has not been completed, and if intermediate data or compressed data resides in the DRAM 404 as the next band of data of this page, then it is determined whether this data is intermediate data or compressed data (step S918).

If an intermediate code is discriminated at step S918, then the control unit 402 make various settings in the rasterizer in order to generate image data from this intermediate code. Rendering is performed by the rasterizer 406 in accordance with these settings (step S919). The rendering operation and data path are similar to those mentioned in the rendering operation of step S912, and the storage location of the generated image data is the band buffer for which transmission of the data has already been completed.

If compressed data is discriminated at step S918, then the control unit 402 sets the compression/decompression unit 405 in order generate the next band of image data and causes the unit 405 to decompress the compressed data (step S619) In accordance with the setting, the compression/decompression unit 405 decompresses the compressed data (step S920). The processing of this step is similar to that of the decompression operation of step S913.

When the generation of one processing unit of image data in one band at step S919 or step S920 is finished, the program advances to step S921, at which it is determined whether one band of an image has been generated. One band of image data is generated by repeating rendering of the processing units, which are contained in one band, by the rasterizer 406 and decompression by the compression/decompression unit 405 (steps S918, S919, S920, S921). In order to implement this operation, the rasterizer 406 and compression/decompression unit 405 are capable of two-channel DMA in input and output directions. In addition, it is required that DMA transfer be extended to make possible transfer that takes into account offset of the storage address of the transferred data.

If one band of image data is generated by repeating steps S918, S919, S920, S921, the program returns to step S916. During the operation represented by steps S918, S919, S920, S921 following step S917, the DMAC 407 sends the band image data in the DRAM 404 to the engine 409 via the engine interface 408. Whether the sending of the data has ended is judged at step S917. It is presumed that the total length of time for the processing of steps S918, S919, S920, S921 following step S917 is shorter than the time needed to send the image data from within the band buffer. In other words, the data rate of the memory, the data rate of rendering/decompression and the band buffer capacity are decided and each component is controlled in such a manner that overrun will not occur.

The processing of steps S916~S921 is repeated until one page of image data is sent to the printer engine, i.e., until the printing of one page is finished (step S922).

According to this embodiment, in a case where an area to undergo intermediate code processing and an area to undergo pre-rendering processing overlap, the resulting compound area is calculated by the control unit 402 and the objects included in the compound area are subjected to pre-rendering processing to realize printing. As a result, designation of pre-rendering processing can be performed on a per-object basis. As a result, opportunities for pre-rendering processing can be reduced greatly, overrun can be prevented and printing speed can be raised.

In the first embodiment, the host computer designates either pre-rendering processing or intermediate code processing in band units. However, according to this embodiment and a third embodiment which follow, the designation is made in object units. Accordingly, according to the second and third embodiments, the host side makes the designation on a per-object basis and not on a per-band basis.

To accomplish this, the data dealt with at steps S152 and S155 in FIG. 16 vanish as far as band units are concerned. The processing described next, therefore, is executed.

Processing similar to that of the first embodiment is performed at step S154. At step S155, however, pre-rendering is designated in relation to an object that causes the time required for image generation to exceed a predetermined value. Accordingly, at the time of calculation at step S152, the time necessary to develop each object is not merely summed in band units. Instead, a table is created by arranging the objects in order of the times necessary to develop them. If it is determined at step S153 that the time necessary to develop a band has exceeded the predetermined value, objects are selected from the created table in an amount corresponding to the excess time and pre-rendering processing is designated for the objects selected.

Thus, it is possible to designate the processing method in object units without causing overrun.

Third Embodiment

In accordance with the third embodiment, the manner in which objects overlap in a portion where such overlap occurs is stored in memory. Without changing a pre-rendering processing designation or intermediate code processing designation in regard to the objects, each object is processed just as designated.

First, the printer receives code data specific to the printer or draw data described in PDL or the like from the data supply source such as the host computer 400 and the controller 402 stores the received data in the DRAM 404 via the memory controller 403 (step S1201). In order to compensate for a difference in speed between the communication speed of the interface and the data processing speed, the received data generally is buffered temporarily in the reception buffer provided in the DRAM 404. The processing of step S901 corresponds to this operation.

Next, the control unit 402 analyzes the buffered input data and converts the data to internal data suited to band processing. At the same time, the control unit 402 calculates an area of overlap between an area to undergo intermediate code processing and an area to undergo pre-rendering processing, as shown in FIGS. 8A, 8B. It is determined which data is on top and the information resulting from this determination is stored, together with each processing unit, as information regarding each processing unit (step S1202). More specifically, following the operation for dividing one page of image instructions into band processing units in order to perform band control, the control unit 402 calculates the image-overlap compound areas 804, 808 in each band in the content shown in the example of FIGS. 9A, 9B, recognizes which image, namely the image of the data expressed by an intermediate code or the image data that has been compressed, is on top and stores this image. FIG. 9B is a diagram showing a state in which character for which intermediate code processing has been designated is overwritten by an image for which pre-rendering processing has been designated. FIG. 9A is an example of a state in which image data is overwritten by character. Which of these states exists is recognized and stored at step S1202.

Figure 5:
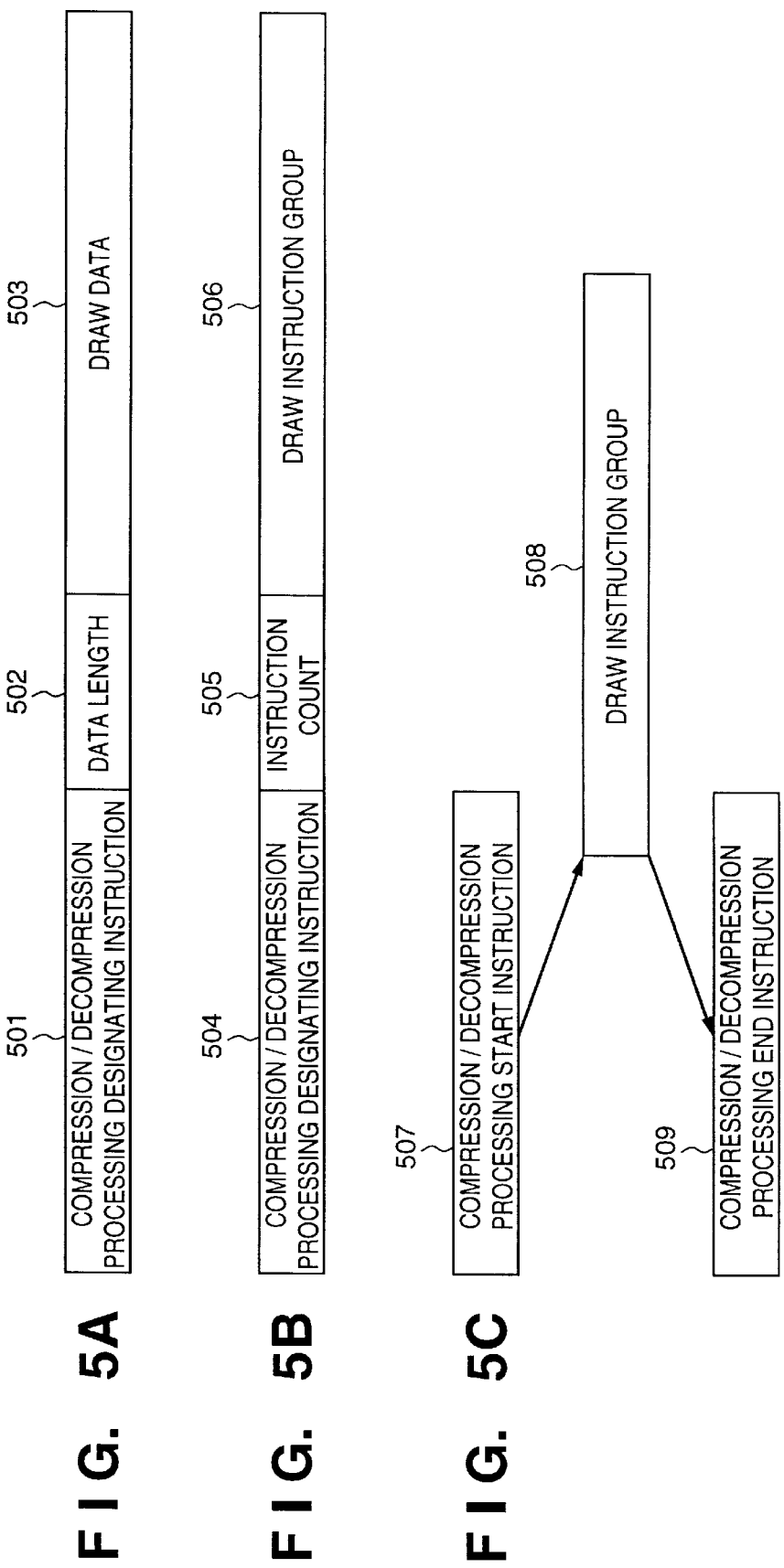
FIGS. 5A, 5B and 5C are diagrams showing instruction formats by which a data supply source instructs a printer controller in regard to processing content according to the first embodiment of the present invention.

Next, on the basis of the results from the analysis of the input data, the control unit 402 determines whether data to undergo processing is print data (such as shown in the example of FIG. 5) for which pre-rendering processing has been designated (step S1203). The program proceeds to step S1204 if compression/decompression processing has been designated. Otherwise, the program proceeds to step S1205.

If it is found at step S1203 that pre-rendering processing has been designated, then, on the basis of an draw instruction group that has been received along with this designation or on the basis of an draw instruction contained in within the calculated compound area, the control unit 402 generates image data using the rasterizer 406. The image data is stored in the DRAM 404 via the memory controller 403 (step S1204).

When rendering of an object for which pre-rendering processing has been designated is completed at step S1204, the control unit 402 makes various settings in regard to the compression/decompression unit 405, such as designation of compression processing and setting of source data to be compressed and compressed data storage areas, and then starts up the compression/decompression unit 405 to begin compression processing (step S1206).

The compression/decompression unit 405 reads the image data, which was generated at step S1204, out of the DRAM 404 via the memory controller 403, compresses the data and then stores the compressed data in the DRAM 404 via the memory controller 403 (step S1207).

If it is found at step S1203 that pre-rendering has not been designated, then the control unit 402 creates intermediate data (step S1205) for performing high-speed rendering after the start of the printing operation. The generated intermediate data is stored in the DRAM 404 via the memory controller 403 (step S1207).

Next, the control unit 902 determines whether the processing of one band has been completed, with the program returning to step S1203 if the answer is "NO" (step S1208). In this loop, therefore, intermediate data, in which intermediate codes for generating image data by the rasterizer and compressed image data to be decompressed by the compression/decompression unit are mixed, is generated is one band.

When an intermediate code or compressed data is generated as intermediate data necessary at the time of printing through the processing up to step S1208, the control unit 402 determines whether one page of this intermediate data has been generated (step S1210). If one page of intermediate data has been generated, the program proceeds to step S1211. If one page of intermediate data has not been generated, then the program proceeds to step S1201 and the above-described processing is repeated until one page of intermediate data is generated. In order to simplify the description, the flowchart is written such that the program returns to step S1201 if one page of intermediate data has not yet been generated at step S1210. In actuality, however, there are instances where a data input/buffering queuing operation is managed by separate tasks. In such case a task for judging the condition at step S1209 and a task for queuing data from the data supply source using an external interface at step S1201 would run separately. The point to which a return would be effected from the condition judging task of step S1209 would be step S1202, namely the step of reading the queued input data from the buffer and analyzing the data.

Next, the control unit 402 starts processing regarding the first band at the beginning of a page based upon one page of accumulated intermediate codes or compressed data of each band. In regard to processing units that overlap each other, the underlying processing unit is processed first. The control unit 402 determines whether the initial processing unit is compressed data or an intermediate code (step S1212). The program proceeds to step S1214 in case of compressed data and to step S1213 in case of an intermediate code.

If an intermediate code is discriminated at step S1212, then the control unit 402 generates image data of one processing unit using the rasterizer 406 (step S1213). In this embodiment, use is made of a rasterizer implemented by hardware for the purpose of raising processing speed. To this end, the initial setting of the rasterizer 406 is made at step S1211 and the rasterizer 406 is drawn as an independent block. However, this does not impose a limitation upon the invention and the control unit 402 may analyze the intermediate codes and generate image data. In a case where the rasterizer 406 is constructed of hardware, the control unit 402 sets parameters necessary for the rasterizer 406 and the rasterizer 406 reads out the intermediate code data, which has already been generated and stored in the DRAM 404, via the memory controller 403. The rasterizer 406 generates image data in accordance with this code data and stores the image data in the DRAM 404 via the memory controller 403.

If compressed data is discriminated at step S1212, the control unit 402 sets various parameters in the compression/decompression unit 405 and the compression/decompression unit 405 then decompresses one band of image data (step S1214). More specifically, the compressed data already generated by the above-described processing and stored in the DRAM 404 is read in via the memory controller 403, the code data is decompressed and the decompressed image data is stored in the DRAM 404 again via the memory controller 403. It should be noted that the manner in which data is read and stored at steps S1213, S1214 is not particularly limited. It is assumed here that two-channel DMA transfer for input and output directions is possible in the rasterizer 406 and compression/decompression unit 405. Further, the compressed data that will be decompressed is data in an area for which compression/decompression processing has been designated by the data supply source. This is data that has been decompressed at steps S1204, S1206.

It should be noted that when generated image data is stored in memory, a logical operation that conforms to the extent of object overlap is carried out at steps S1213, S1214. This logical operation will be described later.

Next, the control unit 402 determines whether two bands of image data have been generated (step S1215), with the program returning to step S1212 if the answer is "NO". More specifically, two bands of image data that should be printed are generated in the DRAM 404 by this processing. This is a process for generating two bands of image data in advance in order to avoid overrun to the maximum degree in view of the fact that band control is performed in the apparatus of this embodiment. According to this embodiment, step S1215 is traversed for each and every processing unit. This is similar to the flowchart shown in FIG. 10 of the second embodiment.

Next, the control unit 402 makes various settings in the DMAC 407 for the purpose of sending the engine interface the band image data that has been generated by the above-described processing. The control unit 402 subsequently starts up the printer engine 409 (S1216).

The started engine 409 sends various synchronizing signals to the engine interface 408 and, on the basis of the synchronizing signals, the DMAC 407 starts sending one band of image data that has been stored in the DRAM 404 to the printer engine 409 via the engine interface 408. The control unit 402 waits for the end of transmission of one band of image data (step S1217).

If the transmission of one band of image data is finished, the control unit 402 determines whether one page of data has been sent, i.e. whether the printing of one page has been completed (step S1218). More specifically, if the printing of a page is in progress, the control unit 402 determines whether intermediate data or compressed data of a band to be printed next still remains as one page of data. Setting of the DMAC 407 is performed again in order to print, in parallel with image data generation processing, data that still remains in memory as intermediate codes or compressed data. According to this embodiment, two band memories are provided. The DMAC 407, therefore, is set in such a manner that the engine 409 will be sent the content of the band memory area storing data already generated by the above-described processing but not yet sent to the engine. The setting need not necessarily be performed by the control unit 402. The resetting operation is not particularly limited. The sending of the band image data may be taken as an opportunity to interrupt the software and the control unit 402 may take this opportunity to perform the resetting operation. Alternatively, hardware may perform the resetting operation after one band of image data is sent. In either case, a necessary condition is that overrun not occur in accordance with the data rate of the engine 409.

If it is determined at step S1218 that the printing of one page has not been completed, and if an intermediate code or compressed data resides in the DRAM 404 as the next band of data of this page, then the program branches to step S1219. Here it is determined whether the processing unit to be processed is compressed image data or an intermediate code (step S1219).

If it is discriminated at step S1219 that the processing unit to be processed is an intermediate code, then the control unit 402 make various settings to generate image data from this intermediate code. Rendering is performed by the rasterizer 406 (step S1220). The rendering operation and data path are similar to those mentioned in the rendering operation of step S1213, and the storage location of the generated image data is the band buffer in the DRAM 404 for which transmission of the data has already been completed.

If compressed data is discriminated at step S1219, then the control unit 402 sets the compression/decompression unit 405 again in order generate the next band of image data. The compressed data is decompressed by the compression/decompression unit 405 (step S1221). The processing of this step is similar to that of the decompression operation of step S1214.

It should be noted that when image data generated at steps S1220, S1221 is stored in memory, a logical operation described below is executed in such a manner that the image of an underlying object is written over the image of the overlying object.

When the generation of one processing unit of image data in one band at step S1220 or step S1221 is finished, the program advances to step S1222, at which it is determined whether one band of an image has been generated. More specifically, in regard to all processing units included in one band, rendering by the rasterizer 406 and decompression by the compression/decompression unit 405 is repeated in regular order from the underlying object (steps S1219~S1222). One band of an image is generated. In order to implement this operation, the rasterizer 406 and compression/decompression unit 405 are capable of two-channel DMA in input and output directions. In addition, it is required that DMA transfer be extended to make possible transfer that takes into account offset of the storage address. In actuality, images are generated by performing processing starting from the underlying processing unit on the printing paper.

In case of the example shown in FIG. 8A, decompression processing is executed first and the image data in the circle 703 is generated (in actuality, a rectangular image data which includes the circle is decompressed). Thereafter, the characters 702 are generated in memory (the DRAM 404) from the intermediate codes in accordance with an overwriting logical operation rule. Conversely, in the case of FIG. 8B, the image of the characters 705 are generated first from the intermediate code processing data, then the compressed data is decompressed to generate the image 706 and the results are stored in memory (the DRAM 404) in accordance with the overwriting logical operation rule.

If one band of image data is generated by repeating steps S1219~S1222, the program returns to step S1217. During the operation represented by steps S1219~S1222 following step S1218, the DMAC 407 sends the band image data in the DRAM 404 to the engine 409 via the engine interface 408. Whether the sending of the data has ended is judged at step S1217. It is presumed that the total length of time for the processing of steps S1219~S1222 following step S1218 is shorter than the time needed to send the image data from within the band buffer. In other words, the data rate of the memory, the data rate of rendering/decompression and the band buffer capacity are decided and each component is controlled in such a manner that overrun will not occur.

The processing of steps S1217~S1222 is repeated until one page of image data is sent to the printer engine, i.e., until the printing of one page is finished (step S1223).

Figure 13:
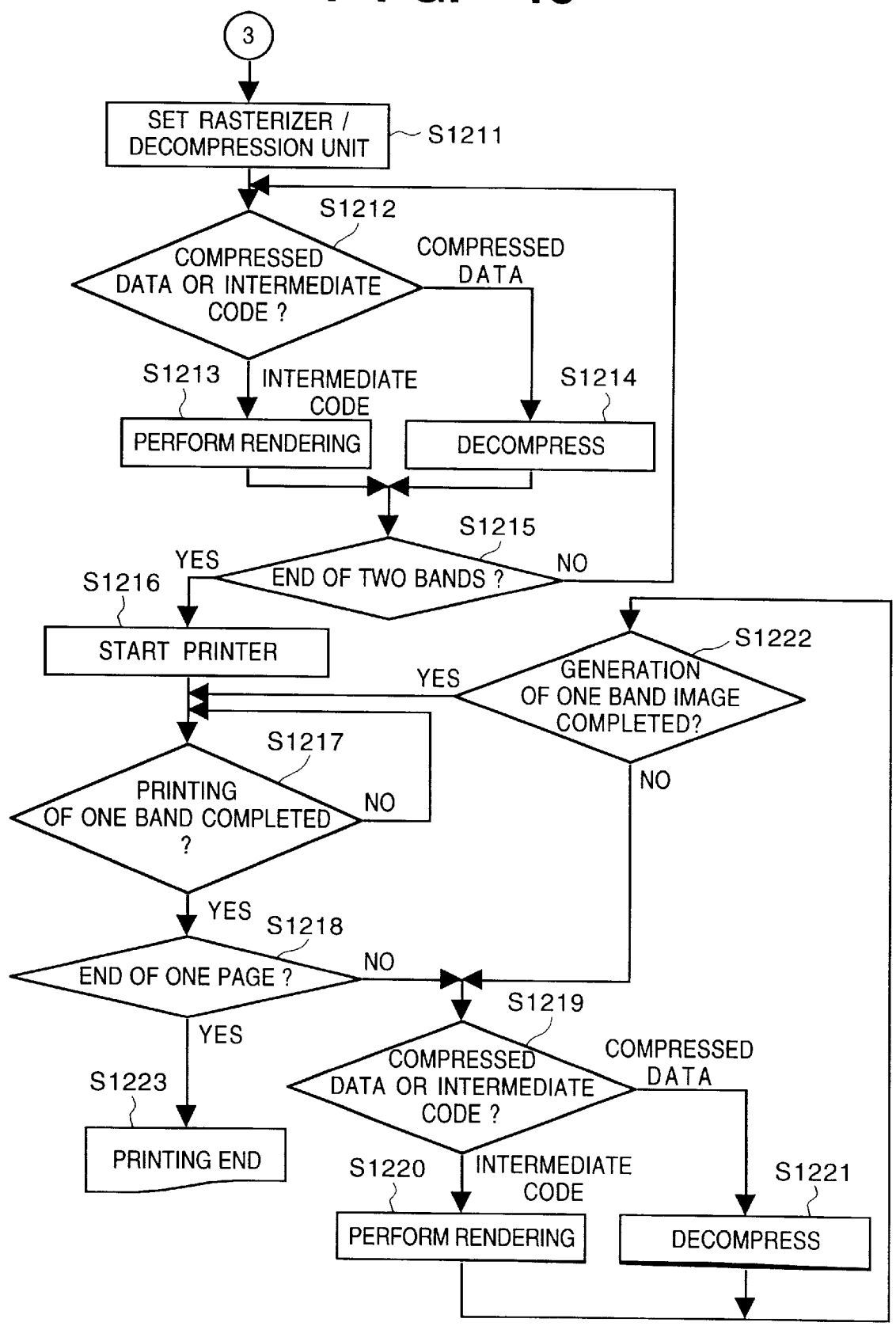
FIG. 13 is a flowchart, which is a continuation of the flowchart of FIG. 12, showing the flow of operation in a case where a data supply source instructs a printer controller in regard to intermediate code processing and compression/decompression processing object drawing, this being a case in which overwrite logic is supported as a logical operation.

According to this embodiment, information is analyzed and stored at step S1202 in the order of overlap of the objects and a decision regarding the overwrite data in processing units is made at step S1219 based upon the information that has been stored. At step S1202, however, a process for sorting processing data in terms of the order thereof in accordance with the overwriting rule may be performed before performing the setting process of the rendering/decompression units. If this is carried out so that the order of the processing data will agree with the sequence of overwriting on the printing paper, then it will be possible to execute processing in the order in which the intermediate data in a band has been stored in the memory (DRAM 404). Moreover, when an image is actually stored, it will suffice to perform overwriting and complicated processing is unnecessary. That is, since a logical operation is not required when image data is stored, this arrangement can be more beneficial than that represented by the flow of FIG. 13. Occasions for pre-rendering can be reduced further and printing speed can be raised.

<Logical Operation Unit>

Figure 12:
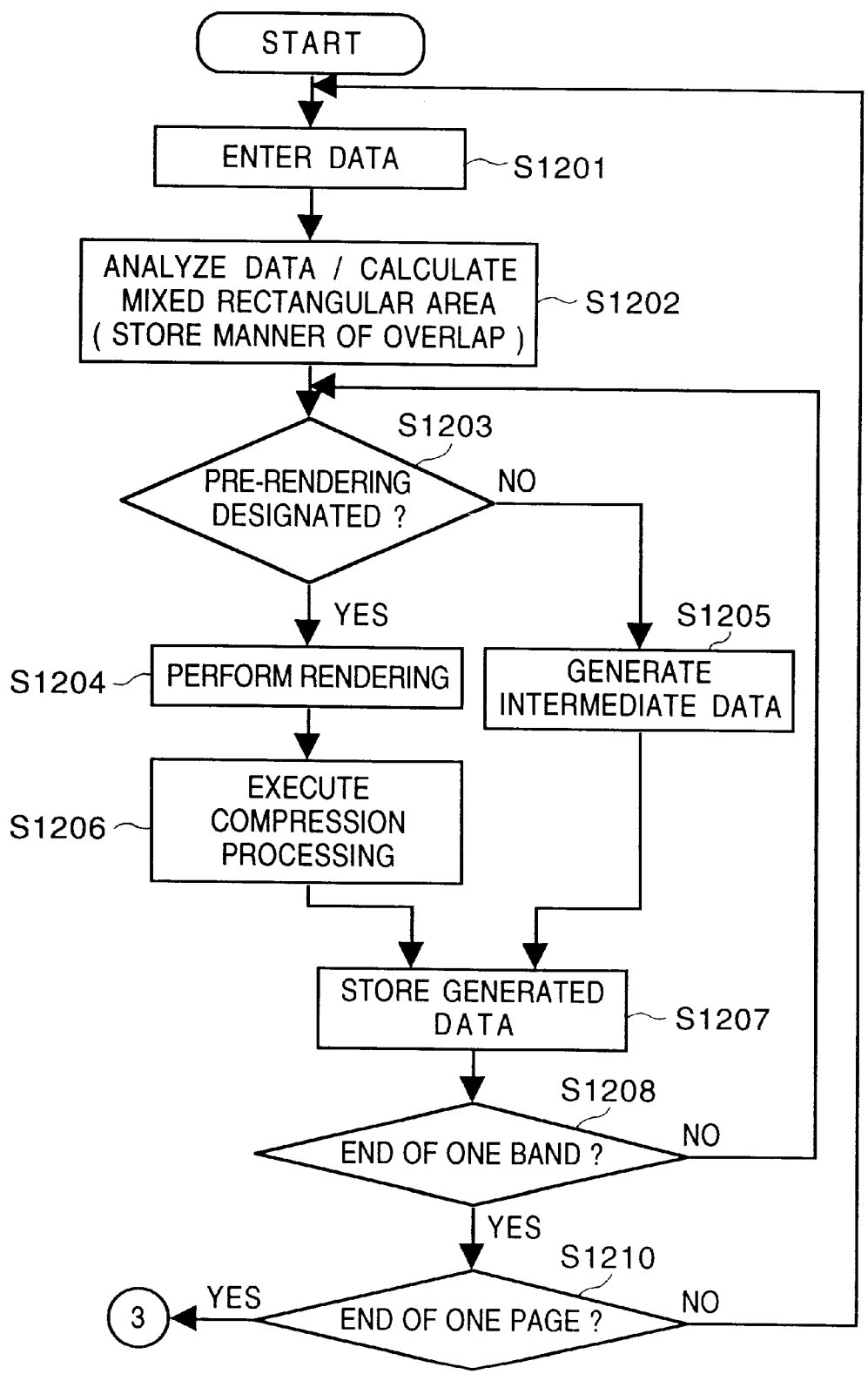
FIG. 12 is a flowchart showing the flow of operation in a case where a data supply source instructs a printer controller in regard to intermediate code processing and compression/decompression processing at object drawing, this being a case in which overwrite logic is supported as a logical operation.
Figure 14:
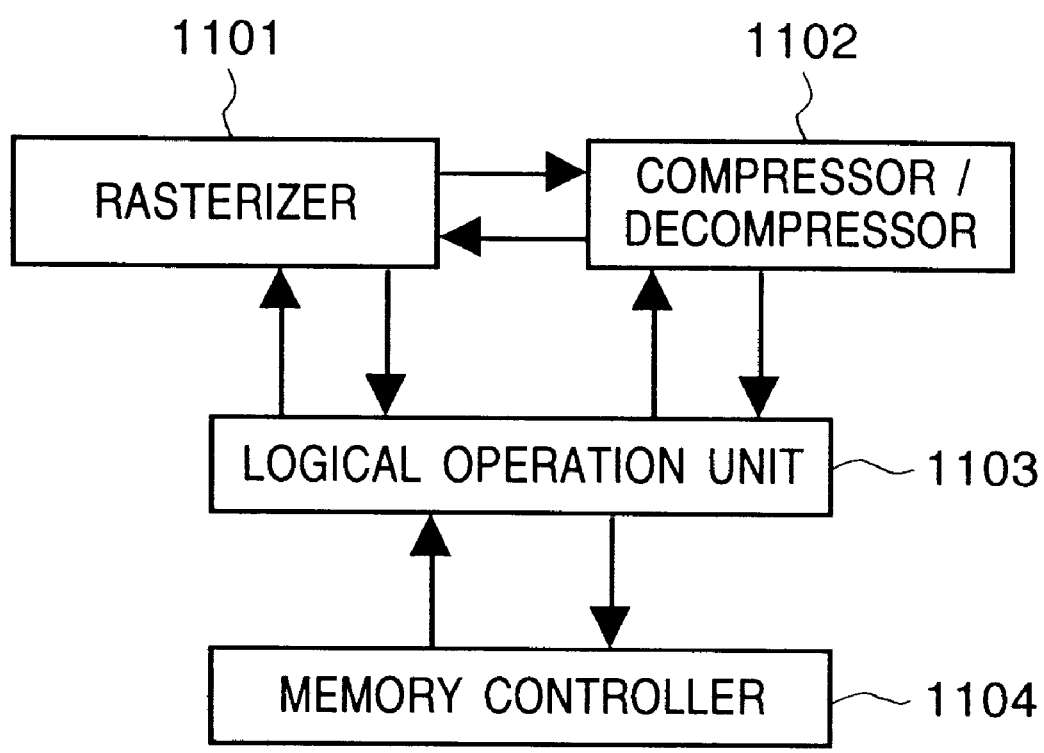
FIG. 14 is a block diagram showing an example of the connection between a logical operation unit and a rasterizer, compression/decompression unit and memory controller.

There is no particular limitation upon the method of implementing the logical operation for representing the overlapping of object images. An example of the components involved is as shown in FIG. 14. The logical operation is carried out when generated image data is stored in the band buffer through steps S1204, S1213, S1214, S1211, S1220, S1221 of FIG. 12.

A rasterizer 1101 may be the same as the rasterizer 406 of FIG. 1 and may be implemented by hardware or software, and the compressor/decompressor 1102 may be the same as rasterizer 406 of FIG. 1, with there being no limitation upon the compression algorithm per se. However, there is conformity with the operating conditions described in connection with the operation of FIG. 1. A logical operation unit 1103 reads in image data to be processed and subjects image data that has already been read into memory and image data to be read in to a logical operation on a per-pixel basis. The particular method does not matter. A memory controller 1104 is the same as the memory controller 403 in FIG. 1 and supervises the generation of timing for accessing a DRAM (404 in FIG. 1), which is the main memory of the apparatus, the operation of memory refresh and access source arbitration.

Figure 15:
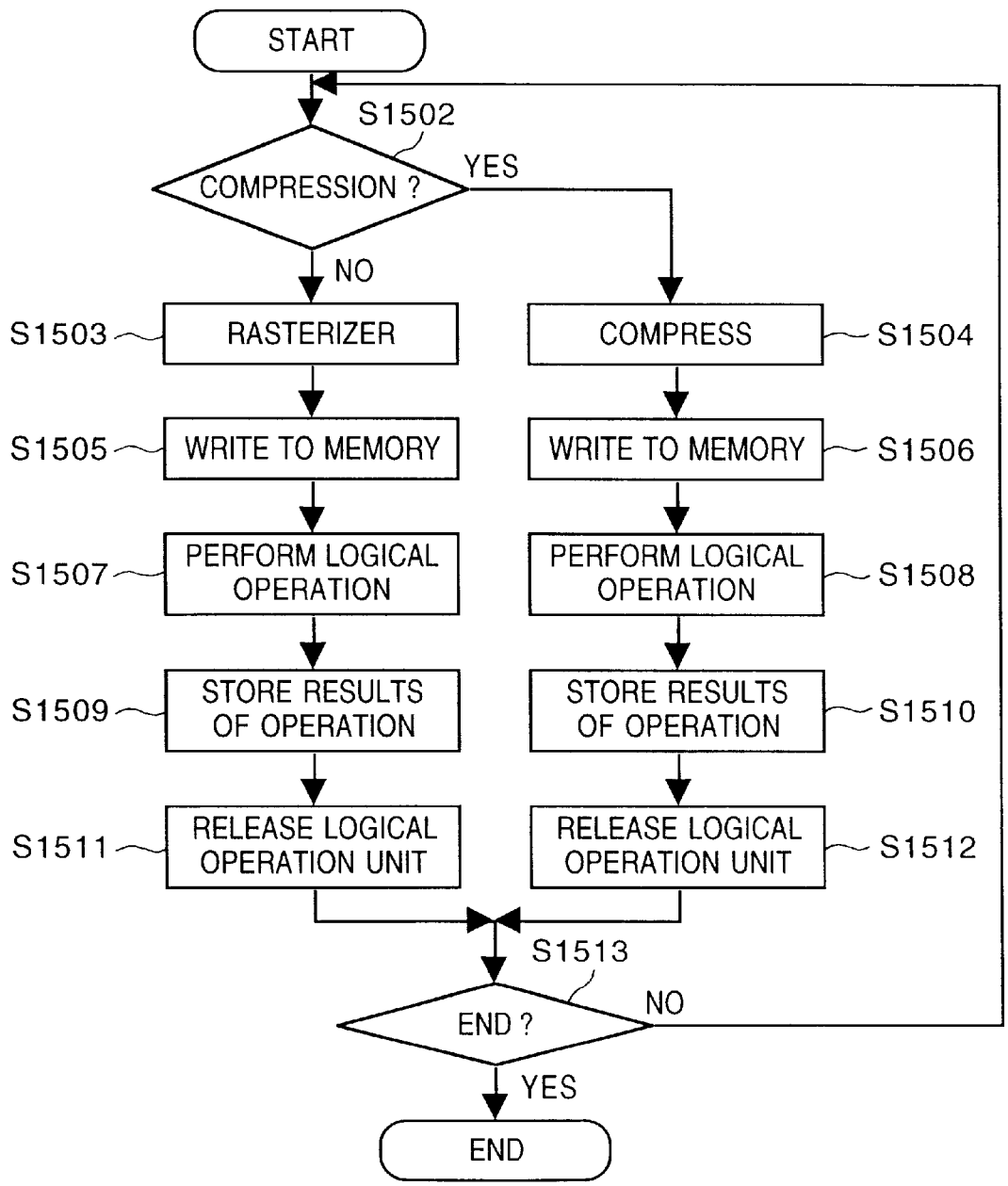
FIG. 15 is a flowchart showing an example of the flow of operation performed by the logical operation unit.

Operation when a logical operation is performed will be described with reference to the flowchart of FIG. 15. It should be noted that only the operation of the logical operation unit is shown; other operation is basically the same as that indicated in the flowcharts described thus far. The procedure of FIG. 15 corresponds to steps for decompression of a compressed image or steps for rasterization of an intermediate code in the flowcharts of the embodiments. Processing is decided at step S1502 in dependence upon whether data to be processed is compressed image data or an intermediate code.

It is determined at step S1502 if data undergoing processing is compressed data or an intermediate code.

If it is determined at step S1502 that the data is intermediate code data, image data is generated by the rasterizer 1101 (406) based upon intermediate code data that has been generated in the DRAM 404. Concurrently, the compressor/decompressor 1102 is notified by an arbitration signal of the fact that the logical operation unit 1103 is being used. As a result, simultaneous operation of the rasterizer 1101 and compressor/decompressor 1102 is avoided.

It should be noted that the flowchart of this embodiment is written to show that the operation of the rasterizer 1101 and the decompressing operation of the compressor/decompressor 1102 are not simultaneous. This is not an indispensable condition. However, in a case where the rasterizer 1101 and compressor/decompressor 1102 are each equipped with a logical operation unit, simultaneous operation is avoided in order to avoid the simultaneous writing of data to the same destination area. By adopting this expedient, the rasterizer and compressor/decompressor will be capable of simultaneous operation in limits allowed by the bus band in regard to generation of image data in different areas. On the other hand, in a case where image data is generated in one and the same area from an intermediate code and compressed image data, the intermediate data can be sorted beforehand in line with the sequence of object overlap and the rasterizer and compressor/decompressor can be operated in conformity with the sequence. Further, if the printer is a color printer, the logical operation between objects can be expanded to a color logical operation.

Next, the rasterizer 1101 sends the logical operation unit 1103 area information, which indicates the image data write area, together with image data generated at step S1503. The logical operation unit 1103 reads in data from the DRAM 404, in which the corresponding destination image data has been stored, via the memory controller 1104 (step S1505).

Next, the logical operation unit 1103 performs a logical operation between the destination image data read in at step S1505 and image data sent from the rasterizer 1101 (step S1507). It should be noted that there is no particular limitation upon the method of implementing the logical operation.

Next, the logical operation unit stores the generated image data operated on at step S1507 in the DRAM 404, which is the main memory of this embodiment, via the memory controller 1104 (step S1509).

When this operation is completed, the compressor/decompressor 1102 is notified by an arbitration signal of the fact that the logical operation unit 1103 has been released (step S1511).

By virtue of the above operation, the generation of image data in regard to one processing unit is completed in a case where the source data of the image data to be generated is an intermediate code. Furthermore, in a case where processing data exists, the program returns to step S1502 (step S1513).

If it is determined at step S1502 that the data is compressed data, then, in a manner similar to that in the case where the data was found to be intermediate code data, the rasterizer 1101 is notified of use of the logical operation unit 1103 and the compressed data is decompressed at step S1504. The corresponding destination data is read in from the DRAM 404 via the memory controller 1104 at step S1506. A logical operation is performed at step S1508 between the decompressed data and the destination data that has been read in and the result of the logical operation is stored in the DRAM 404 via the memory controller 1104 at step S1510. Notification of end of use of the logical operation unit 1103 by the compressor/decompressor 1102 is given at step S1512 and decompression of the compressed data of one processing unit, namely the generation of image data, ends.

Overwriting by one value (overwriting by write data and overwriting by written data exist) can be mentioned as an example of a type of logical operation in addition to OR, AND and exclusive-OR operations. In regard to overwriting, the sequence thereof is in accordance with the result of analysis performed at step S1202. In regard to other types of operations, the sequence is decided by designation on a per-object basis. It should be noted that there is no particular limitation upon the method of calculating a compound area in which a portion which undergoes intermediate code processing and a portion which undergoes pre-rendering processing are mixed. The examples of the compound areas also are not limited those shown in FIGS. 9A, 9B according to this embodiment. Areas can be dealt with in dependence upon the type of processing.

In accordance with the embodiment of this embodiment, as described above, an object to be pre-rendered is designated from a band by means of a host computer, wherein the band is such that there is the possibility of overrun. A printer responds to the designation by pre-rendering the object. This makes it possible to prevent overrun. At this time, the overlapping of objects is examined and rendering can be carried out in such a manner that the original state of overlap can be reproduced. Further, when image data is generated from an object that has been converted to an intermediate code, a desired image can be obtained by applying an appropriate logical operation.

Further, since pre-rendering is designated in object units, processing overhead due to pre-rendering processing can be minimized.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

According to the present invention as described above, changeover between pre-rendering processing of print data and processing for a conversion to an intermediate code is carried out in dependence upon a designation for a data supply source. Processing is changed over by the data supply source in dependence upon prediction of printer overrun. That is, when the data source side sends data, a portion that may cause overlapping of objects, namely an area in which many objects exist, is extracted and pre-rendering processing is designated for this area. In accordance with the designation, a changeover between pre-rendering processing and intermediate code processing takes place in the printer, whereby overrun can be prevented. Throughput can be improved by designating pre-rendering processing in band units.

Throughput can be increased further by designating pre-rendering processing in object units.

Further, pre-rendering processing is applied only to an area in which print data for which pre-rendering processing has been designated and print data for which this processing has not been designated overlap. As a result, areas subjected to pre-rendering can be minimized and throughput can be increased further.

In regard to an area in which data for which pre-rendering processing has been designated and print data for which this processing has not been designated overlap, the sequence of overlap is stored in memory. At image generation, images are generated in the stored sequence through the processing designated. As a result, throughput can be increased while overrun is prevented. In addition, it is possible to prevent an image exactly as created by the host computer.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus for outputting an image to a printer engine, comprising:

a receiver, arranged to receive, from an external apparatus, print data generaed by the external apparatus, wherein the print data includes a pre-rendering instruction designating an object to be developed into image data;

an intermediate data generator, arranged to generate first image data from the object designated by the pre-rendering instruction included in the print data before starting the printer engine and which generates intermediate data from another object in the print data; and an outputter that generates second image data based on the intermediate data generated by said intermediate data generator, and which outputs the first image data and previously-generated second image data to the printer engine, while generate the second image data based on the intermediate data.

2. The apparatus according to claim 1, wherein said intermediate data generator generates the intermediate data on a per-band basis.

3. The apparatus according to claim 1, wherein the print data comprises a combination of draw instructions, which are units in which drawing is performed, an output procedure is designated by the pre-rendering instruction per each draw instruction, and said intermediate data generator generates the intermediate data per each draw unit.

4. The apparatus according to claim 3, wherein said intermediate data generator discriminates an area in which a draw instruction for which generation of image data has been designated by the pre-rendering instruction and a draw instruction for which generating of an intermediate code has been designated are mixed, and, with regard to the draw instructions included in the area, generates image data from the draw instructions and compresses the generated image data.

5. The apparatus according to claim 3, wherein in a case where a draw instruction for which generation of compressed image data has been designated and a draw instruction for which generation of an intermediate code has been designated overlap, said intermediate data generator generates the intermediate data in accordance with the pre-rendering instruction and stores the sequence of overlap of drawn images, and said outputter generates the second image data from the intermediate data in accordance with the stored sequence of overlap.

6. A printing system comprising a host apparatus for generating print data in page units, and a printing control apparatus, which is connected to the host apparatus, for forming and outputting to a printer engine an image in band units obtained by partitioning a page into bands, wherein said host apparatus includes:

an estimator, arranged for estimating, for each band, a necessary time needed to generate image data from the print data;

a determiner, arranged for determining an object to be pre-rendered by said printing control apparatus in accordance with the necessary time estimated by said estimator; and a controller, arranged for including a pre-rendering instruction designating the object determined by said determiner in the print data;

and wherein said printing control apparatus includes:

a receiver that receives, from said host apparatus, the print data in which the pre-rendering instruction designating the object to be developed into image data is included;

an intermediate data generator, arranged for generating first image data from the object designated by the pre-rendering instruction included in the print data before starting the printer engine, and which generates intermediate data from another object in the print data; and an outputter, arranged for generating second image data based on the intermediate data generated by said intermediate data generator, and which outputs the first image data and previously-generated second image data to the printer engine, while generating the second image data based on the intermediate data.

7. The system according to claim 6, wherein said intermediate data generator generates the intermediate data on a per-band basis.

8. The system according to claim 6, wherein the print data comprises a combination of draw instructions, which are units in which drawing is performed, said pre-rendering instruction designates a print data output procedure per each draw instruction, and said intermediate data generator generates the intermediate data per each draw unit.

9. A print control apparatus for generating print data that includes a pre-rendering instruction and forwarding the print data to a printing apparatus which performs pre-rendering in accordance with the pre-rendering instruction, comprising:

an estimator, arranged for estimating, for each band, a necessary time needed to generate image data from the print data;

a determiner, arranged for determining an object to be pre-rendered by said printing apparatus in accordance with the necessary time estimated by said estimator;

a controller, arranged to include the pre-rendering instruction designating the object determined by said determiner in the print data; and an interface for forwarding the print data including the pre-rendering instruction to the printing apparatus.

10. The printing control apparatus according to claim 9, wherein said pre-rendering instruction designates a procedure for outputting the print data on a per-band basis.

11. The printing control apparatus according to claim 9, wherein the print data comprises a combination of draw instructions, which are units in which drawing is performed, and said pre-rendering instruction designates a print data output procedure per each draw unit.

12. An image output control method for outputting an image to a printer engine, comprising the steps of:

a receiving step, of receiving, from an external apparatus, print data generated by the external apparatus, wherein the print data includes a pre-rendering instruction designating an object to be developed;

an intermediate data generating step, of generating first image data from the object designated by the pre-rendering instruction embedded in the print data before starting the printer engine, and generating intermediate data from another object in the print data; and an output step, of generating second image data based on the intermediate data generated in the intermediate data generating step, and outputting the first image data and previously-generated second image data to the printer engine, while generating the second image data based on the intermediate data.

13. The method according to claim 12, wherein said intermediate data generating step generates the intermediate data on a per-band basis.

14. The method according to claim 12, wherein the print data comprises a combination of draw instructions, which are units in which drawing is performed, an output procedure is designated by the pre-rendering instruction per each draw instruction, and said intermediate data generating step includes generating the intermediate data per each draw unit.

15. The method according to claim 14, wherein said intermediate data generating step includes discriminating an area in which a draw instruction for which generation of image data has been designated by the pre-rendering instruction and a draw instruction for which generating of an intermediate code has been designated are mixed, and, with regard to the draw instructions included in the area, generates image data from the draw instructions and compresses the generated image data.

16. The method according to claim 14, wherein, in a case where a draw instruction for which generation of compressed image data has been designated and a draw instruction for which generation of an intermediate code has been designated, overlap, said intermediate data generating step includes generating the intermediate data in accordance with the pre-rendering instruction and storing the sequence of overlap of drawn images, and said output step includes generating the second image data from the intermediate data in accordance with the stored sequence of overlap.

17. An image output control method for generating print data in page units, the print data including a pre-rendering instruction, and for forwarding the print data to a printing apparatus which performs pre-rendering in accordance with the pre-rendering instruction, comprising the steps of:

an estimating step, of estimating, for each band, a necessary time needed to generate image data from the print data;

a determining step, of determining an object to be pre-rendered by the printing apparatus in accordance with the necessary time estimated in the estimating step;

including the pre-rendering instruction designating the object determined in the determining step in the print data; and a forwarding step, of forwarding the print data including the pre-rendering instruction to the printing apparatus.

18. The method according to claim 17, wherein said pre-rendering instruction designates a procedure for outputting the print data on a per-band basis.

19. The method according to claim 17, wherein the print data comprises a combination of draw instructions, which are units in which drawing is performed, and said pre-rendering instruction designates a print data output procedure per each draw instruction.

20. A computer readable storage medium storing a program which includes codes for executing:

a receiving processing step, of receiving, from an external apparatus, print data generated by the external apparatus, wherein the print data includes a pre-rendering instruction designating an object to be developed into image data;

an intermediate data generating processing step, of generating first image data from the object designed by the pre-rendering instruction included in the print data before starting a printer engine, and generating intermediate data from another object in the print data; and an output processing step, of generating second image data based on the intermediate data generated in said intermediate data generating processing step, and outputting the first image data and previously-generated second image data to the printer engine, while generating the second image data based on the intermediate data.

21. A computer readable storage medium storing a program for generating print data that includes a pre-rendering instruction and for transmitting the print data to a printing apparatus which performs pre-rendering in accordance with the pre-rendering instruction, the program comprising codes for executing:

a processing step of estimating, for each band, a necessary time needed to generate image data from the print data;

a processing step of determining an object to be pre-rendered by the printing apparatus in accordance with the necessary time estimated in the processing step of estimating;

a processing step of including in the print data, the pre-rendering instruction designating the object determined in the processing step of determining; and a processing step of forwarding the print data including the pre-rendering instruction to the printing apparatus.

* * * * *

UNITED STATES PATENT AND TRADEMARK OFFICE
CERTIFICATE OF CORRECTION

PATENT NO. : 6,348,969 B1
DATED : February 19, 2002
INVENTOR(S) : Jun Ikeda

It is certified that error appears in the above-identified patent and that said Letters Patent is hereby corrected as shown below:

Column 1,
Line 51, "the a" should read -- a --.

Column 2,
Line 34, "is be" should read -- is to be --.

Column 3,
Line 2, "allocated" should read -- allocating --;
Line 28, "is page" should read -- in page --; and
Line 59, "t o" should read -- to --.

Column 7,
Line 17, "component" should read -- components --.

Column 8,
Line 19, "and an" should read -- and a --.

Column 12,
Line 24, "parallel" should read -- parallel to --.

Column 13,
Line 42, "character_in" should read -- character in --.

Column 17,
Line 16, "make" should read -- makes --;
Line 26, "order" should read -- order to --; and
Line 27, "S619)" should read -- S619). --.

Column 19,
Line 17, "in within" should read -- within --; and
Line 48, "generated is" should read -- generated as --.

Column 21,
Line 2, "interface" should read -- interface 408 --;
Line 46, "make" should read -- makes --; and
Line 55, "order" should read -- order to --.

UNITED STATES PATENT AND TRADEMARK OFFICE
CERTIFICATE OF CORRECTION

PATENT NO.    : 6,348,969 B1
DATED         : February 19, 2002
INVENTOR(S)   : Jun Ikeda It is certified that error appears in the above-identified patent and that said Letters Patent is hereby corrected as shown below:

Column 22,
Line 58, "overwriting" should read -- overwriting, --.

Column 24,
Line 48, "those" should read -- to those --.

Column 26,
Line 8, "generaed" should read -- generated --; and
Line 22, "generate" should read -- generating --.

Column 28,
Line 60, "designed" should read -- designated --.

Signed and Sealed this

Eighteenth Day of March, 2003

JAMES E. ROGAN
*Director of the United States Patent and Trademark Office*